(12) United States Patent
Sun et al.

(10) Patent No.: US 9,975,775 B2
(45) Date of Patent: May 22, 2018

(54) HIGH SURFACE AREA GRAPHITIZED CARBON AND PROCESSES FOR MAKING SAME

(71) Applicant: Cabot Corporation, Boston, MA (US)

(72) Inventors: Yipeng Sun, West Windsor, NJ (US);
Jian-Ping Shen, Chapel Hill, NC (US);
Gordon Rice, Albuquerque, NM (US);
Paolina Atanassova, Waltham, MA (US); Geoffrey D. Moeser, Groton, MA (US)

(73) Assignee: Cabot Corporation, Boston, MA (US)

( * ) Notice: Subject to any disclaimer, the term of this patent is extended or adjusted under 35 U.S.C. 154(b) by 159 days.

(21) Appl. No.: 14/678,295

(22) Filed: Apr. 3, 2015

(65) Prior Publication Data

US 2015/0210550 A1    Jul. 30, 2015

Related U.S. Application Data

(62) Division of application No. 12/033,859, filed on Feb. 19, 2008, now Pat. No. 9,017,837.

(51) Int. Cl.
*C01B 31/04*      (2006.01)
*H01M 4/90*       (2006.01)
(Continued)

(52) U.S. Cl.
CPC ............. *C01B 31/04* (2013.01); *B82Y 30/00* (2013.01); *C01B 32/20* (2017.08);
(Continued)

(58) Field of Classification Search
CPC ........ B82Y 30/00; C01B 31/04; H01M 4/926; H01M 4/9083; H01M 8/1004; H01M 8/1011; Y02E 60/523; Y02P 70/56
(Continued)

(56) References Cited

U.S. PATENT DOCUMENTS 3,170,811 A    2/1965    Sands
3,615,209 A    10/1971   Whittaker et al.
(Continued)

FOREIGN PATENT DOCUMENTS

CN    101012058 A    8/2007
EP    0 341 907 B1   8/1993
(Continued)

OTHER PUBLICATIONS

Ungar, et al., Microstructure of carbon blacks determined by X-ray diffraction profile analysis, Carbon 2002; 40: 929-937.*
(Continued)

*Primary Examiner* — Daniel C McCracken

(57) ABSTRACT

The invention is directed to high surface area graphitized carbon and to processes for making high surface area graphitized carbon. The process includes steps of graphitizing and increasing the surface area of (in either order) a starting carbon material to form high surface area graphitized carbon. The step of increasing the surface area optionally comprises an oxidizing step (e.g., through steam etching) or template removal from composite particles. The invention is also directed to catalyst particles and electrodes employing catalyst particles that are formed from the high surface area graphitized carbon.

14 Claims, 11 Drawing Sheets

(51) Int. Cl.
*B82Y 30/00* (2011.01)
*H01M 4/92* (2006.01)
*H01M 8/1004* (2016.01)
*C01B 32/20* (2017.01)
*H01M 8/1011* (2016.01)

(52) U.S. Cl.
CPC ......... *H01M 4/9083* (2013.01); *H01M 4/926* (2013.01); *H01M 8/1004* (2013.01); *H01M 8/1011* (2013.01); *Y02E 60/523* (2013.01); *Y02P 70/56* (2015.11)

(58) Field of Classification Search
USPC .................. 423/449.1–449.8, 448, 460, 461; 502/416–438
See application file for complete search history.

(56) References Cited

U.S. PATENT DOCUMENTS

| | | |
|---|---|---|
| 3,684,763 A | 8/1972 | Frazier |
| 3,940,344 A | 2/1976 | Yokogawa et al. |
| 3,951,856 A | 4/1976 | Repik et al. |
| 4,263,268 A * | 4/1981 | Knox ............... B01J 20/20 264/29.1 |
| 6,297,408 B1 | 10/2001 | Haas et al. |
| 2002/0009626 A1 | 1/2002 | Terazono et al. |
| 2002/0015888 A1 | 2/2002 | Omaru et al. |
| 2003/0026755 A1 | 2/2003 | Jaroniec et al. |
| 2005/0008562 A1 | 1/2005 | Hyeon et al. |
| 2005/0129604 A1 | 6/2005 | Pak et al. |
| 2005/0244644 A1 | 11/2005 | Hampden-Smith et al. |
| 2006/0188772 A1 | 8/2006 | Starz et al. |
| 2007/0003822 A1 | 1/2007 | Kocha et al. |
| 2007/0037039 A1 | 2/2007 | Chondroudis et al. |
| 2007/0116624 A1 | 5/2007 | Joo et al. |

FOREIGN PATENT DOCUMENTS

| | | |
|---|---|---|
| EP | 0 890 549 A1 | 1/1999 |
| EP | 1 494 304 A1 | 1/2005 |
| GB | 800975 | 9/1958 |
| JP | 06-196174 A | 7/1994 |
| JP | 2000-273351 A | 10/2000 |
| JP | 2002/015745 A | 1/2002 |
| JP | 2002-308613 A | 10/2002 |
| JP | 2004/071253 A | 3/2004 |
| JP | 2005/026174 A | 1/2005 |
| JP | 2006-347864 A | 12/2006 |

OTHER PUBLICATIONS

Zheng, X., et al., "Effect of Thermal and Oxidative Treatments of Activated Carbon on Its Surface Structure and Suitability as a Support for Barium-Promoted Ruthenium in Ammonia Synthesis Catalysts", Carbon 2002, vol. 40, pp. 2597-2603.

Mbileni, C., et al., "Synthesis of Mesoporous Carbon Supports via Liquid Impregnation of Polystyrene onto a MCM-48 Silica Template", Elsevier, Carbon, vol. 44, (2006), pp. 1476-1483.

Lei, Z., et al., "Graphitized Carbon with Hierarchical Mesoporous Structure Templated from Colloidal Silica Particles," Microporous and Mesoporous Materials 109, Elsevier Science Publishing, New York, vol. 109, (2008), pp. 109-117.

Wang, L., et al., "Relationship Between Pore Surface Areas and Electric Double Layer Capacitance in Non-Aqueous Electrolytes for Air-Oxidized Carbon Spheres", Elsevier, Electrochimica Acta, vol. 51 (2006), pp. 4096-4102.

Thomas, W.J., "Effect of Oxidation on the Pore Structure of Some Graphitized Carbon Blacks", Department of Chemical Engineering, Carbon 1966, vol. 3, pp. 435-443.

International Search Report and The Written Opinion of the International Searching Authority, or the Declaration of International Application No. PCT/US2008/008209, mailed Mar. 12, 2009.

Extended European Search Report of EP Application No. 14001337.6, mailed on Jun. 17, 2014.

* cited by examiner

HIGH SURFACE AREA GRAPHITIZED CARBON AND PROCESSES FOR MAKING SAME

CROSS REFERENCE TO RELATED APPLICATION

This application is a divisional of and claims priority to U.S. patent application Ser. No. 12/033,859, filed on Feb. 19, 2008, hereby incorporated in its entirety by reference herein.

FIELD OF THE INVENTION

The present invention relates to graphitized carbon. In particular, the invention relates to processes for making high surface area graphitized carbon, which preferably is suitable for catalyst applications.

BACKGROUND OF THE INVENTION

Discussion of Background Information

Fuel cells are electrochemical devices in which the energy from a chemical reaction is directly converted to current electricity. During operation of a fuel cell, a continuous flow of fuel, e.g., hydrogen (or a liquid fuel such as methanol), is fed to the anode while, simultaneously, a continuous flow of an oxidant, e.g., air, is fed to the cathode. The fuel is oxidized at the anode causing a release of electrons through the agency of a catalyst. These electrons are then conducted through an external load to the cathode, where the oxidant is reduced and the electrons are consumed, again through the agency of a catalyst. The constant flow of electrons from the anode to the cathode constitutes an electrical current which can be made to do useful work.

Traditionally, fuel cell catalysts comprise an active phase disposed on electrically conductive support particles such as carbon blacks. In addition to the composition and structure of the active phase employed, the composition and structure of the support particles is of utmost importance. In general, support particles should have a high surface area so as to maximize the surface on which active phase may be disposed and thereby maximizing reactant/catalyst contact.

In addition, support particles should be sufficiently durable under fuel cell operating conditions. For most fuel cell applications, the support phase should be sufficiently durable under load cycling conditions and at high potentials. Durability of commonly used carbon supports is a major challenge due to corrosion at high cell potentials and temperatures, and especially during start/stop cycles typical for transportation applications. Thus, the need exists for highly durable high surface area support particles suitable for use as catalyst supports in fuel cell applications, and in particular automotive fuel cell applications.

SUMMARY OF THE INVENTION

The present invention is directed to processes for making high surface area graphitized carbon, which preferably is suitable for use as catalyst support particles. The high surface area graphitized carbon is particularly suited for catalyst applications in which an active phase is disposed on the high surface area graphitized carbon. The catalyst may be employed, for example, in an electrode layer in a fuel cell, e.g., a direct methanol fuel cell or a hydrogen air fuel cell.

In a preferred aspect, the catalyst is an oxygen reduction catalyst used in the cathode of a $H_2$-Air fuel cell.

In a first embodiment, the invention is to a process for making high surface area graphitized carbon, comprising the steps of graphitizing a starting carbon material to form graphitized carbon; and oxidizing at least a portion of carbon in the graphitized carbon to form high surface area graphitized carbon.

In a second embodiment, the steps are reversed, and the invention is to a process for making high surface area graphitized carbon, comprising the steps of oxidizing a portion of a starting carbon material to form high surface area carbon, preferably having mesoporosity; and graphitizing the high surface area carbon to form high surface area graphitized carbon.

The starting carbon material optionally comprises carbon black, amorphous carbon, and/or partially graphitized carbon. In the first embodiment, if the starting carbon material comprises partially graphitized carbon, the graphitized carbon (after the graphitizing step, but prior to increasing surface area, e.g., through oxidation) as well as the high surface graphitized carbon preferably is more graphitized than the partially graphitized carbon. Similarly, in the second embodiment, if the starting carbon material comprises partially graphitized carbon, the high surface area graphitized carbon (after both oxidizing and graphitizing) preferably is more graphitized than the partially graphitized carbon.

Optionally, the graphitized carbon material and/or the high surface area graphitized carbon has a d spacing (average distance between the carbon layer planes) of less than about 0.3500 nm, as measured by XRD. In another aspect, the graphitized carbon and/or the high surface area graphitized carbon has a d spacing of from about 0.3354 nm (fully graphitized carbon, graphite) to about 0.3500 nm (partially graphitized carbon).

The graphitizing step optionally comprises heat-treating the starting carbon material in the first embodiment or the high surface area carbon from the second embodiment to a temperature, e.g., a maximum temperature, ranging from about 1000° C. to about 2700° C. and preferably holding at the maximum temperature, e.g., for from about 0.5 to about 10 hours, for at least 1 minute, or for at least 10 minutes. In another aspect, the graphitizing step comprises contacting the starting carbon material in the first embodiment or the high surface area carbon from the second embodiment with a catalyst at a temperature, e.g., a maximum temperature, less than about 2400° C. and preferably holding at the maximum temperature for a period, e.g., for from about 0.5 to about 10 hours, for at least 1 minute, or for at least 10 minutes.

In the first embodiment, the oxidizing optionally comprises contacting the portion of the graphitized carbon with one or more of oxygen-containing agents such as $O_2$, air, $O_3$, an oxygen-containing acid such as $HNO_3$, steam, or $CO_2$, optionally in the presence of catalyst, under conditions effective to oxidize the portion of the graphitized carbon and form the high surface area graphitized carbon. In another aspect, the oxidizing comprises fluidizing the graphitized carbon with a fluidizing medium comprising steam for a period of time from about 0.5 to about 15 hours, the fluidizing medium optionally having a temperature of from about 600° C. to about 1500° C.

Similarly, in the second embodiment, the oxidizing optionally comprises contacting the portion of the starting carbon material with one or more of oxygen-containing agents such as $O_2$, air, $O_3$, an oxygen-containing acid such as $HNO_3$, steam, or $CO_2$, optionally in the presence of catalyst, under conditions effective to oxidize the portion of the carbon starting material and form the high surface area carbon. In another aspect, the oxidizing comprises fluidizing the starting carbon material with a fluidizing medium comprising steam for a period of time from about 0.5 to about 15 hours, the fluidizing medium optionally having a temperature of from about 600° C. to about 1500° C.

Optionally, in the first embodiment, the difference in surface area between the high surface area graphitized carbon and the graphitized carbon is greater than about 100 $m^2/g$, e.g., greater than about 300 $m^2/g$. For example, the surface area of the high surface area graphitized carbon optionally is from about 200 $m^2/g$ to about 800 $m^2/g$, e.g., from about 200 $m^2/g$ to about 400 $m^2/g$, or from about 400 $m^2/g$ to about 800 $m^2/g$. Similarly, in the second embodiment, the difference in surface area between the high surface area carbon and the carbon starting material optionally is greater than about 300 $m^2/g$, e.g., greater than about 500 $m^2/g$. For example, the surface area of the high surface area carbon optionally is from about 200 $m^2/g$ to about 800 $m^2/g$, e.g., from about 200 $m^2/g$ to about 400 $m^2/g$, or from 400 $m^2/g$ to about 800 $m^2/g$.

In another embodiment, the invention is to high surface area graphitized carbon formed by any of the above described processes. In another aspect, the invention is to a catalyst composition comprising the high surface area graphitized carbon formed according to any of the above-described processes and an active phase disposed thereon. In another embodiment, the invention is to an electrode comprising the catalyst composition.

In another embodiment, the invention is to a process for making high surface area graphitized carbon particles, comprising the steps of providing composite particles, each particle comprising a carbon phase and a template phase; graphitizing the composite particles to form graphitized composite particles; and removing the template phase from the graphitized composite particles to form high surface area graphitized carbon particles. The process optionally further comprises the steps of mixing silica particles having a porous structure with a carbon precursor under conditions effective for the carbon precursor to infiltrate the porous structure of the silica particles; and converting the carbon precursor to carbon within the porous structure of the porous silica particles to form the composite particles provided in the providing step. The carbon phase optionally comprises carbon black, amorphous carbon and/or partially graphitized carbon. If the carbon phase comprises partially graphitized carbon, then the high surface area graphitized carbon particles preferably is more graphitized than the partially graphitized carbon.

In another embodiment, the invention is to a process for making high surface area graphitized carbon particles, comprising the steps of providing composite particles, each particle comprising a carbon phase and a template phase; removing the template phase from the composite particles to form high surface area carbon particles; and graphitizing the high surface area carbon particles to form high surface area graphitized carbon particles. The process optionally further comprises the steps of mixing silica particles having a porous structure with a carbon precursor under conditions effective for the carbon precursor to infiltrate the porous structure of the silica particles; converting the carbon precursor to carbon within the porous structure of the porous silica particles to form the composite particles provided in the providing step. The carbon phase optionally comprises hydrocarbons, polymers, carbon black, amorphous carbon and/or partially graphitized carbon. If the carbon phase comprises partially graphitized carbon, then the high surface area graphitized carbon particles preferably is more graphitized than the partially graphitized carbon.

In another embodiment, the invention is directed to a membrane electrode assembly (MEA) comprising an electrocatalyst layer comprising catalyst particles, wherein the catalyst particles comprise an alloy active phase disposed on carbon support particles, and wherein the MEA loses less than 50 mV performance, e.g., less than 25 mV performance, at 1 $A/cm^2$ after sustaining at least 100 hours, e.g., at least 200 hours, of Corrosion Testing Protocol, as defined herein. In a preferred aspect, the carbon support particles have been subjected to oxidation and graphitization. The MEA optionally has a loading of less than 0.5 mg $Pt/cm^2$, e.g., less than 0.4 mg $Pt/cm^2$, less than 0.2 mg $Pt/cm^2$, or less than 0.1 mg $Pt/cm^2$. The carbon support particles optionally have a surface area greater than 400 $m^2/g$.

BRIEF DESCRIPTION OF THE DRAWINGS

The present invention will be better understood in view of the following non-limiting figures, wherein.

DETAILED DESCRIPTION OF THE INVENTION

Introduction

Figure 1:
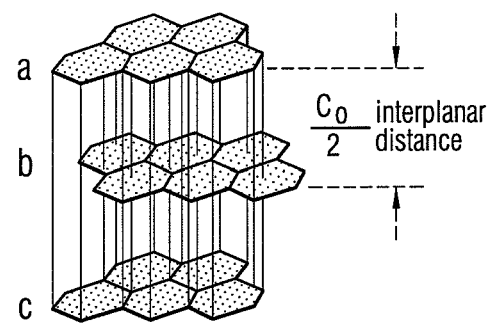
FIG. 1 illustrates the unit cell structure of graphite.

The present invention, in some embodiments, is directed to processes for making high surface area graphitized carbon, preferably suitable for use as catalyst support particles, more preferably for fuel cell catalyst support particles. The high surface area graphitized carbon is particularly suited for catalyst applications in which an active phase is disposed on the high surface area graphitized carbon. In addition, the high surface graphitized carbon of the present invention preferably has high durability and corrosion resistance. The catalyst may be employed, for example, in an electrode layer in a fuel cell, e.g., a direct methanol fuel cell or a hydrogen air fuel cell.

As indicated above, some embodiments of the present invention are directed to processes for forming high surface area graphitized carbon. In one embodiment, for example, the invention is to a process for making high surface area graphitized carbon, comprising the steps of graphitizing a starting carbon material to form graphitized carbon, and oxidizing at least a portion of the carbon in the graphitized carbon to form high surface area graphitized carbon. In another embodiment, the steps are reversed, and the invention is to a process for making high surface area graphitized carbon, comprising the steps of oxidizing at least a portion of a starting carbon material to form high surface area carbon, and graphitizing the high surface area carbon to form high surface area graphitized carbon. In either embodiment, the starting carbon material optionally comprises carbon black, amorphous carbon, and/or partially graphitized carbon. Optionally, the carbon material comprises pelletized carbon black. If the starting carbon material comprises partially graphitized carbon, then, in various embodiments, the graphitized carbon (in the above-described embodiment where graphitizing occurs before oxidizing), as well as the high surface graphitized carbon (in either embodiment) preferably is more graphitized than the partially graphitized carbon.

In another embodiment, the invention is to a process for making high surface area graphitized carbon particles, in which the process employs composite particles that include a carbon phase and a template phase. In this embodiment, the process comprises the steps of providing composite particles, each particle comprising a carbon phase and a template phase; graphitizing the composite particles to form graphitized composite particles; and removing the template phase from the graphitized composite particles to form high surface area graphitized carbon particles. The process optionally further comprises the steps of: (i) mixing silica particles having a porous structure with a carbon precursor under conditions effective for the carbon precursor to infiltrate the porous structure of the silica particles; and (ii) converting the carbon precursor to carbon within the porous structure of the porous silica particles to form the composite particles provided in the providing step. The carbon phase optionally comprises carbon black, amorphous carbon and/or partially graphitized carbon. If the carbon phase comprises partially graphitized carbon, then the high surface area graphitized carbon particles preferably are more graphitized than the partially graphitized carbon. The carbon phase may include hydrocarbons disposed thereon or within the pores thereof.

In another embodiment, the process involves composite particles having a carbon phase and a template phase, as in the previous embodiment, but the order of the graphitizing and removing steps is reversed. Specifically, in this aspect, the invention is to a process for making high surface area graphitized carbon particles, comprising the steps of providing composite particles, each particle comprising a carbon phase and a template phase; removing the template phase from the composite particles to form high surface area carbon particles; and graphitizing the high surface area carbon particles to form high surface area graphitized carbon particles. The process optionally further comprises the steps of: (i) mixing silica particles having a porous structure with a carbon precursor under conditions effective for the carbon precursor to infiltrate the porous structure of the silica particles; and (ii) converting the carbon precursor to carbon within the porous structure of the porous silica particles to form the composite particles provided in the providing step. The carbon phase optionally comprises hydrogen carbon, carbon black, amorphous carbon and/or partially graphitized carbon. If the carbon phase comprises partially graphitized carbon, then the high surface area graphitized carbon particles preferably are more graphitized than the partially graphitized carbon.

In another embodiment, the invention is to high surface area graphitized carbon formed by any of the above-described processes. In another aspect, the invention is to a catalyst composition comprising the high surface area graphitized carbon formed according to any of the above-described processes and an active phase disposed thereon. In other embodiments, the invention is to processes for forming such catalyst compositions. In other embodiments, the invention is to an electrode comprising the catalyst composition, and to processes for forming such electrodes.

In another embodiment, the invention is directed to a membrane electrode assembly (MEA) comprising an electrocatalyst layer comprising catalyst particles, wherein the catalyst particles comprise an alloy active phase disposed on carbon support particles, and wherein the MEA loses less than 50 mV performance, e.g., less than 25 mV performance, at 1 A/cm$^2$ after sustaining at least 100 hours, e.g., at least 200 hours, of Corrosion Testing Protocol. In a preferred aspect, the carbon support particles have been subjected to oxidation and graphitization. The MEA optionally has a loading of less than 0.5 mg Pt/cm$^2$, e.g., less than 0.4 mg Pt/cm$^2$, less than 0.2 mg Pt/cm$^2$, or less than 0.1 mg Pt/cm$^2$. The carbon support particles optionally have a surface area greater than 400 m$^2$/g. For purposes of this embodiment, "Corrosion Testing Protocol" means the Corrosion Testing Protocol identified in the Example Section, below. In addition, "by at least X hours of Corrosion Testing Protocol" it is meant that the MEA has been subjected to the Corrosion Testing Protocol identified below, for least X hours, wherein the X hours is the cumulative amount of hours at which the MEA has been subjected to 1.2 volts, as described in Step 2, Accelerated Corrosion protocol, identified in the Example Section, below. That is, for purposes of the present specification, "X hours" does not include time testing under Step 1, Beginning of Life Performance, identified in the Example Section, below.

Starting Carbon Material

The physicochemical properties of the starting carbon material may vary widely. In an optional embodiment, the starting carbon material comprises carbon black. Optionally, the starting carbon material comprises pelletized carbon black, which optionally has an average pellet size greater than 10 µm, e.g., greater than 25 µm, greater than 50 µm, greater than 100 µm, greater than 200 µm, greater than 500 µm, or greater than 1 mm. The average pellet size preferably is less than 5 mm. In terms of ranges, the carbon black starting material, e.g., pelletized carbon black starting material, optionally has an average pellet size of from about 10 µm to about 5 mm, e.g., from about 100 µm to about 5 mm, or from about 200 µm to about 2 mm. The carbon black starting material optionally has a pellet size distribution with 0% to 3% by weight greater than 2 mm, 15% to 80% by weight between 1 and 2 mm, 15% to 80% by weight between 500 µm and 1 mm, 1% to 15% by weight between 250 µm and 500 µm, 0% to 10% by weight between 125 µm and 250 µm, and 0% to 5% by weight less than 125 µm. In this context, the pellet size distribution and average pellet size is determined by passing the carbon black pellets through a vibrating series of stacked sieves with decreasing mesh size and then measuring the mass collected on each sieve as per ASTM D1511-00, the entirety of which is incorporated herein by reference.

If a fluidized bed reactor is employed in any of the process steps of the present invention (e.g., in the oxidizing step, as described below), then the carbon black starting material preferably is suitable for fluidization. For example, the carbon black starting material, in this aspect, preferably is substantially free of carbon black fines, defined herein as the fraction of carbon black particles passing through a #120 mesh sieve, e.g., having a pellet size less than about 125 µm, which tend to exhibit poor fluidization characteristics. In various optional embodiments, the carbon black starting material comprises less than about 15 weight percent carbon black fines, e.g., less than about 10 weight percent, less than about 5 weight percent or less than about 2 weight percent carbon black fines.

The average primary particle size ($D_r$) as determined by ASTM D3849-04 (also called the ASTM particle size), the entirety of which is incorporated herein by reference, of the carbon starting material, e.g., carbon black starting material, optionally is less than about 100 nm, e.g., less than about 75 nm, less than about 50 nm, less than about 30 nm, less than about 20 nm, or less than about 10 nm. In terms of ranges, the average primary particle size of the carbon starting material optionally is from about 5 nm to about 100 nm, e.g., from about 10 to about 50 nm, from about 10 nm to about 40 nm, from about 10 nm to about 30 nm or from about 10 nm to about 20 nm.

Carbon black aggregates are defined as structures of primary carbon black particles that are fused at the contact points and cannot readily be separated by shearing. The average aggregate size ($D_{agg}$) of the carbon starting material may be extracted from TEM image analysis using the imaging technique described in ASTM D3849-04, the entirety of which is incorporated herein by reference, and then specifically determined based on the following equation:

$$D_{agg} = \sqrt{(D_{max} D_{min})}$$

where $D_{max}$ is the arithmetic number average maximum diameter of the particles from TEM analysis, and $D_{min}$ is the arithmetic number average minimum diameter of the particles from TEM analysis. In some exemplary embodiments, the carbon starting material has an average aggregate size that is less than about 500 nm, e.g., less than about 400 nm, less than about 300 nm, less than about 200 nm, or less than about 100 nm. In terms of ranges, the average aggregate particle size of the carbon black starting material optionally is from about 30 nm to about 500 nm, e.g., from about 50 to about 300 nm, or from about 100 nm to about 300 nm.

The structure of the carbon starting material, e.g., carbon black starting material, may be characterized by the ratio of the average aggregate size to the average primary particle size ($D_{agg}/D_p$). The ratio of $D_{agg}/D_p$ for the carbon black starting material optionally ranges from about 1 to about 12, e.g., from about 2 to about 10 or from about 4 to about 10, with a higher number indicating a greater structure. In terms of lower range limitations, the ratio of $D_{agg}/D_p$ for the carbon black starting material optionally is greater than about 4, e.g., greater than about 7 or greater than about 11.

If any of the process steps occur in a fluidized bed reactor, the bulk density of the carbon starting material may have a significant impact on the fluidization characteristics of the carbon black starting material. In some exemplary embodiments, the bulk density of the carbon starting material, e.g., carbon black starting material or pelletized carbon black starting material, optionally is from 0.15 to 0.5 g/cm$^3$, e.g., from 0.2 to 0.45 g/cm$^3$, or from 0.25 to 0.45 g/cm$^3$.

The primary particle and aggregate sizes of the high surface area graphitized carbon formed by the processes of the present invention may be controlled by selecting a carbon black starting material with the appropriate morphology. Furnace carbon blacks are available in a wide range of primary particle and aggregate sizes. These carbon black starting materials optionally may be unetched, or may have been etched to some degree in situ (i.e., within the carbon black reactor). Other carbon blacks such as, for example, thermal blacks, acetylene blacks, lamp blacks, channel blacks, or gas furnace blacks may be employed as the carbon black starting materials.

In some specific non-limiting examples, the carbon black starting material comprises one or more carbon blacks selected from the group consisting of Ketjen black EC600, Ketjen black EC300, Vulcan XC72 (with or without binder), Black Pearls 700, Black Pearls 800, Vulcan XC605, Regal 350, Regal 250, Black Pearls 570, and Vulcan XC68.

Graphitization

Graphite is a crystalline form of carbon in which the carbon atoms possess sp2 hybridized bonds. The carbon atoms in graphite are arranged in hexagonal substantially planar rings that are stacked in a sequence such as ABAB or ABCABC. Adjacent stacked layers are arranged generally one on top of the other as shown in FIG. 1. The carbon-carbon bond length is about 1.42 Å (0.142 nm) in the hexagonal rings and about 3.354 Å (0.3354 nm) in the direction of the c axis, which is perpendicular to the rings. The stacked layers comprise a hexagonal array of carbon atoms held by stable covalent bonds, but with weak Van der Waals forces between the layers. X-ray diffraction (XRD) analysis of graphite displays major diffraction peaks for (002), (10), (004) and (110) planes. The degree of graphitization of a carbon material may be characterized by its "d spacing," which is defined herein as the average distance between adjacent hexagonal rings in the direction of the c axis, as determined by XRD (002) diffraction peak. The d spacing can be calculated according to Braggs's law with the following formula:

$$d = \frac{\lambda}{2\mathrm{Sin}\theta}$$

Where:
 $\lambda$=Wavelength of radiation source (1.54 Å for copper)
 $\theta$=The diffraction angle in degrees (peak 002)
 d=Spacing distance between two carbon layer planes Amorphous carbon can be considered as sections of hexagonal carbon layers of varying size, with little order parallel to the layers. Generally, for purposes of the present specification, carbon materials having a d spacing less than about 3.500 nm are considered graphitic carbon. As one skilled in the art will appreciate, the terms amorphous carbon and graphite are relative terms, and a continuum of various carbon phases exists between these two phases. The carbon phases for carbon black, for example, typically are between the above extremes.

As indicated above, various embodiments of the present invention include a step of graphitizing a carbon-containing material. In some aspects, the carbon-containing material comprises the carbon starting material, e.g., carbon black, amorphous carbon, partially graphitized carbon, high surface area carbon or composite particles. The step of graphitizing advantageously increases the average pore size and the corrosion resistance of the carbon-containing material. The composition formed after the graphitizing step optionally is then oxidized to form high surface area graphitized carbon.

In another embodiment, the carbon-containing material comprises composite particles, and the graphitizing step forms graphitized composite particles. As used herein, the term "composite particles" means particles having at least two distinct compositional and/or structural phases. In a preferred aspect, the composite particles comprise a carbon phase and a template phase. In this aspect, after the graphitizing step, the template phase preferably is removed from the graphitized composite particles to form high surface area graphitized carbon particles.

In another aspect, the carbon-containing material comprises high surface area carbon, e.g., high surface area carbon which already has been oxidized, for example, through a steam etching process, and/or high surface area carbon which has been formed by removing a template from composite carbon particles. In this aspect, high surface area graphitized carbon is formed during the graphitizing step (without necessitating a subsequent oxidizing step or a template removal step). Of course, further treating (e.g., oxidizing or template removal) of the high surface area graphitized carbon after the graphitizing step may be employed if desired, for example, to further increase the surface area of the high surface area graphitized carbon.

According to the various embodiments of the present invention, the term "graphitizing" (and variations thereof) means increasing graphite content. By increasing graphite content it is meant that the percentage of graphite increases relative to amorphous carbon phases and the d spacing value as measured by XRD decreases, regardless of whether the carbon material formed in the graphitizing is considered graphite (as a whole). Similarly, as used herein, the term "graphitized carbon" means carbon that has been subjected to a graphitizing step, and which may or may not constitute graphite.

The graphitizing step optionally comprises heat treating the carbon-containing material, e.g., starting carbon material, to a graphitization temperature for a period of time sufficient to graphitize the carbon-containing material. As used herein the term "graphitizing temperature" means a temperature at which the structure of the carbon in the carbon-containing material is modified so as to increase the amount of graphitized carbon phase in the carbon-containing material, relative to the amount of amorphous carbon phases.

The graphitizing temperature may vary widely, depending, for example, on the specific composition of the carbon-containing material. In a preferred embodiment, the graphitizing temperature ranges from about 800° C. to about 3000° C., e.g., from about 1000° C. to about 2700° C.

Similarly, the period of time at the final temperature sufficient to graphitize the carbon-containing material may vary. In various exemplary embodiments, the period of time is from about 1 minute to about 10 hours, e.g., from about 0.5 to about 10 hours, from about 1 to about 8 hours, or from about 3 to about 5 hours.

The graphitizing step may occur in any apparatus capable of sustaining temperatures necessary to graphitize the carbon-containing material. Preferably, the graphitizing occurs in a furnace.

In one embodiment, the graphitizing step occurs in the presence of a catalyst. This embodiment is advantageous in that it allows graphitization at lower temperatures. For example, the graphitizing step optionally comprises contacting a carbon-containing material, e.g., a starting carbon material, with a catalyst at a temperature less than about 1200° C., e.g., less than about 1000° C. or less than about 800° C., for a period of time of from about 0.5 to about 10 hours, e.g., from about 1 to about 8 hours or from about 3 to about 5 hours. The specific catalyst employed may vary widely. A non-limiting list of exemplary graphitization catalysts includes metal oxides such as, for example, NiO, CoO, and CaO, metal nitrates such as, for example, $Ni(NO_3)_2$, $Co(NO_3)_2$, and $Fe(NO_3)_3$, and alkali or alkali earth hydroxides such as, for example, NaOH, KOH, and $Ca(OH)_2$. Any suitable heating device (e.g., in which temperature may be carefully controlled) may be used, such as, for example, a box furnace, rotary calciner or fluidized bed.

Optionally, the graphitizing step forms graphitized carbon having a d spacing of less than 0.3500 nm, e.g., less than 0.3450 nm, or less than 0.3420 nm, as measured by XRD. In another aspect, the graphitizing step forms graphitized carbon having a d spacing from 0.3354 nm to 0.3500 nm, e.g., from 0.3354 to 0.3450 nm, or from 0.3354 to 0.3420 nm. In those embodiments in which the graphitizing step occurs after the oxidizing step, the graphitizing step preferably forms high surface area graphitized carbon having a d spacing ranging from 0.3354 nm to 0.3500 nm, e.g., from 0.3354 nm to 0.3450 nm or from 0.3354 to 0.3420 nm.

As indicated above, graphitizing carbon is desirable because it generally increases corrosion resistance. A number of methods can be used to determine the degree of carbon corrosion resistance for a given carbon sample. For example, the level of carbon corrosion resistance for a carbon sample generally correlates inversely with its d spacing. Generally, the lower the d spacing for a given carbon sample, the greater its corrosion resistance.

Figure 2:
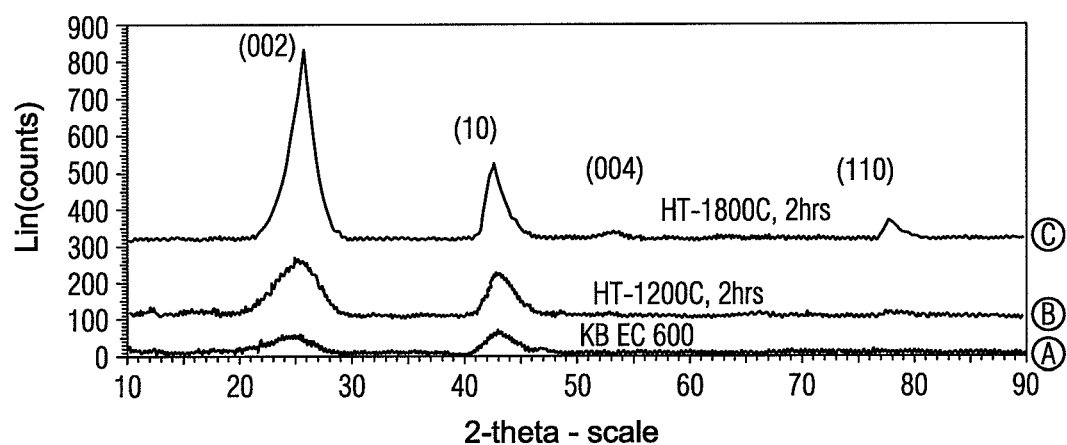
FIG. 2 presents XRD profiles for carbon black (Ketjen black (KB)) prior to heat treatment and after heat treatment at 1200° C. and 1800° C.

FIG. 2 presents XRD profiles for carbon black (Ketjen black (KB)) that has undergone graphitization at temperatures of 1200° C. and 1800° C., respectively, for a dwelling time of about 2 hours. Plot A shows the carbon black prior to heat treating. The very low intensity of the (002) and (10) diffraction peaks and the absence of (004) and (110) diffraction peaks indicate that the carbon black prior to heat treating is substantially amorphous. Upon heat treatment at 1200° C. (Plot B) and particularly at 1800° C. (Plot C), the crystalline content of the carbon increased as evidenced by the presence of (004) and (110) diffraction peaks as well as by the significant increase in intensity of the (002) and (10) diffraction peaks. Without being limited by theory, the heat treating is believed to displace and rearrange the layered planes and small crystallites (amorphous) to form more ordered three-dimensional structures. In terms of microstructure change of the spherical carbon particles upon heat treatment, TEM profiles suggest that the carbon in the center or inner regions of the spherical particles, which are normally comprised primarily of smaller, more imperfect crystallites and more single-layer planes than the carbon regions at the surface of the carbon particles, becomes oriented more parallel to the surface of the particles.

Figure 3:
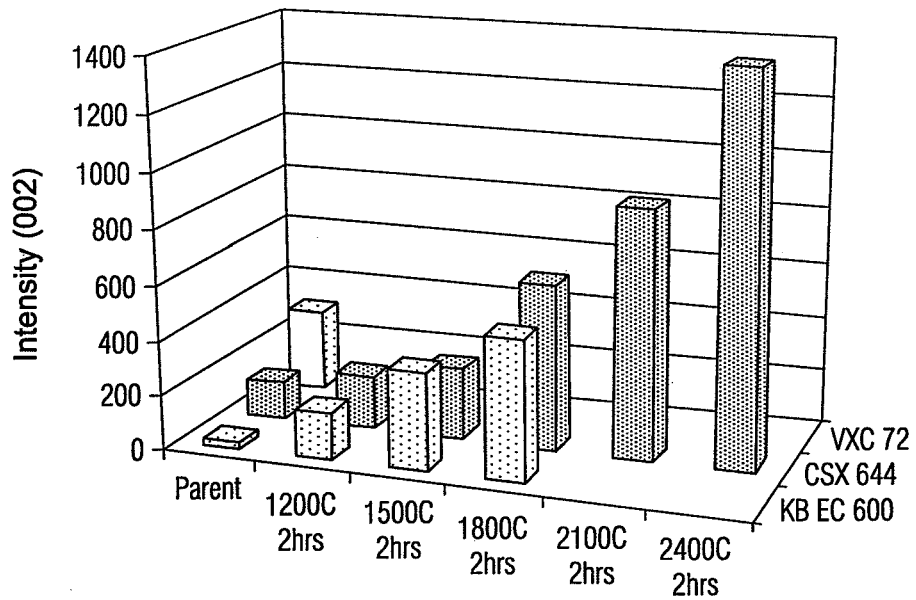
FIG. 3 presents a chart presenting the intensity of XRD peak (002) as a function of heat treating temperature for three different carbon blacks.

FIG. 3 compares the effect of heat treating two different carbon blacks (KB EC 600 and CSX 644) on the intensity of XRD peak (002) as heat treating temperature increased from 1200° C. to 2400° C. for a period of 2 hours for each respective treatment. For comparison purposes, FIG. 3 also illustrates the intensity of XRD peak (002) for un-heat treated VXC 72. As shown, as temperature increased, the intensity of the (002) peak also increased for both carbon blacks reflecting an increase in layered planes that are oriented in the direction of c axis and hence an increase in graphitization.

Figure 4:
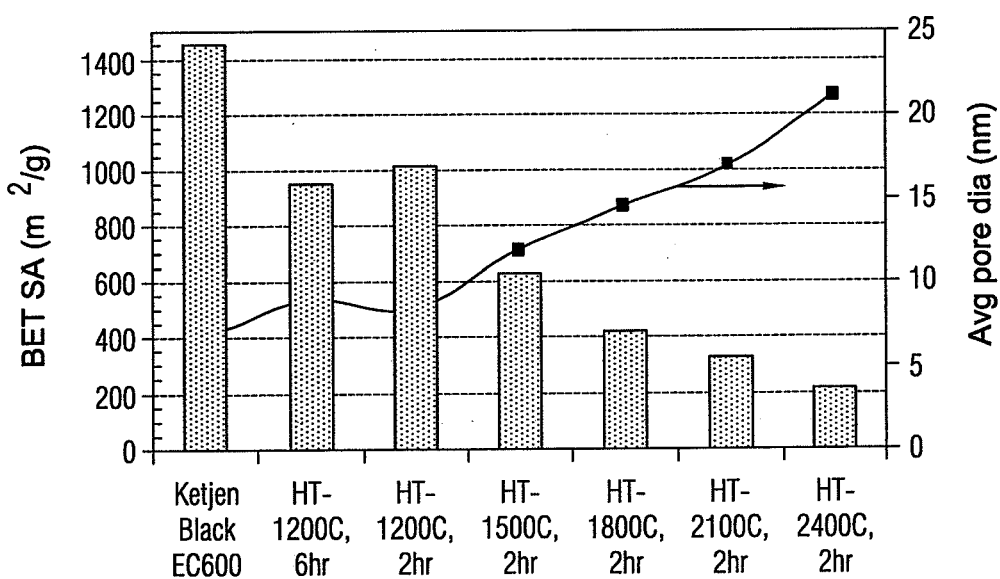
FIG. 4 presents a chart showing that BET surface area decreases and average pore diameter increases as heat treating temperature increases.

Generally, as degree of graphitization increases in the graphitizing step, surface area of the carbon material tends to decrease. This effect is illustrated in FIG. 4, which shows that BET surface area decreases as the graphitizing temperature increases. This decrease in surface area may not be of particular concern if, for example, the graphitized carbon is subsequently treated to increase its surface area (as described in greater detail below) without substantially reducing the corrosion resistance. If no further treating is desired, however, the conditions (e.g., temperature) employed in the graphitizing step should be carefully selected to provide an adequate balance between surface area and corrosion resistance. For example, the graphitizing temperature preferably is less than about 2700° C., e.g., less than about 2500° C. or less than about 2100° C.

FIG. 4 also illustrates that although overall surface area decreases with increasing graphitizing temperature, the average pore diameter of larger pores (about 5 to about 100 mm) tends to increase with increasing graphitizing temperature. This increase in pore size should also be taken into consideration so as to provide graphitized carbon having desired pore size characteristics for the intended application. In contrast, smaller sized pores such as micropores (<2.0 nm) tend to close at increasing graphitizing temperature.

Figure 5:
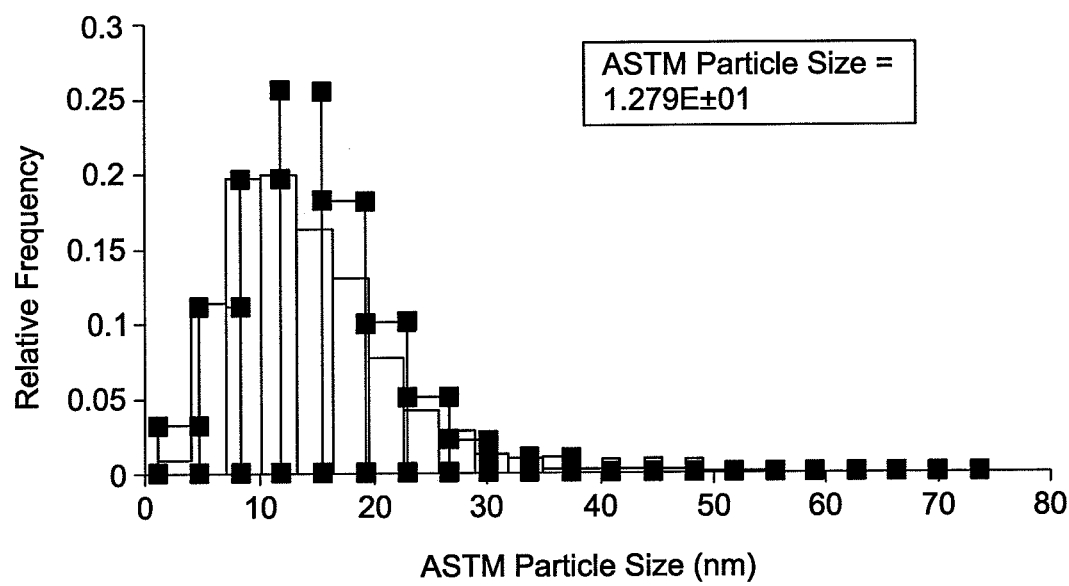
FIG. 5 presents a particle size analysis based on TEM images for KB carbon black prior to heat treatment and KB carbon black after heat treatment.

Additionally, as the degree of graphitization increases and the surface area decreases in the graphitizing step, the average primary particle size of the carbon particles subjected to the graphitizing step surprisingly remains substantially the same. For illustration, in one non-limiting embodiment, the primary particle size based on TEM imaging (shown in FIG. 5) was 12.6 nm for KB EC 600 carbon black prior to heat treatment and 13.9 nm KB EC 600 carbon black after heat treatment at 2100° C. for two hours, with standard deviation of 5.8 nm.

Increasing Carbon Surface Area

The processes of the present invention include steps for increasing the surface area of carbon-containing materials, preferably in combination with a graphitizing step, as described above. In these aspects, the carbon-containing material may comprise, for example, graphitized carbon (i.e., which has already been subjected to a graphitizing step), a carbon starting material (which has not yet been subjected to a graphitizing step), or composite particles (which may or may not have been graphitized). Thus, the step of increasing surface area may occur before or after the graphitizing step. Optionally, the carbon-containing material comprises pelletized carbon black.

Optionally, the difference in surface area between the carbon-containing material after the step of increasing surface area and the carbon-containing material before the step of increasing surface area is greater than about 100 $m^2/g$, e.g., greater than about 200 $m^2/g$, greater than about 300 $m^2/g$ or greater than about 400 $m^2/g$. For example, the surface area of the high surface area graphitized carbon optionally is from about 200 $m^2/g$ to about 1000 $m^2/g$, e.g., from about 200 $m^2/g$ to about 600 $m^2/g$ or from about 200 $m^2/g$ to about 400 $m^2/g$.

The step of increasing the surface area of the carbon-containing material may comprise, for example, a step of oxidizing the carbon-containing material or, in those embodiments employing composite particles, a step of removing a template phase.

A. Oxidation

In one embodiment, the step of increasing surface area comprises a step of oxidizing the carbon-containing material, e.g., graphitized or non-graphitized carbon or composite particles. The oxidizing preferably comprises contacting a portion of the carbon-containing material, e.g., graphitized or non-graphitized carbon, with one or more oxidizing agents, e.g., $O_2$, $O_3$, an oxygen-containing acid, water (e.g., steam), or $CO_2$, optionally in the presence of catalyst, under conditions effective to oxidize the carbon-containing material and preferably form high surface area carbon. In a preferred embodiment, the oxidizing comprises a steam-etching process as described in FIG. 6. As used herein, the term "steam etching" means oxidizing a carbon-containing material with an oxidizing medium, wherein the oxidizing medium comprises steam. In another preferred embodiment, the carbon material is a partially graphitized carbon and the oxidizing medium comprises oxygen.

In a preferred embodiment, the oxidizing occurs in a fluidized bed reaction system. In this aspect, the carbon-containing material optionally comprises pelletized carbon black (which may or may not be graphitized). Pelletized carbon black has been found to exhibit desirable fluidization characteristics for the processes of the present invention. Any of a variety of conventional carbon black pelletization techniques may be employed to pelletize a non-pelletized carbon black material and form a pelletized carbon black starting material. For example, pellets can be formed via wet pelletization, in which fine carbon black powder is fed to a pin mixer with water and then mixed under high shear. Polymeric or small molecule binders can also be added to the water to improve pellet hardness or durability. Another method of pelletizing is dry pelletization, in which fine carbon black powder is fed to a large rotary drum where it is mixed with recycled (or seed) pellets, and the rotating action of the drum causes the fine powder to mix and incorporate with the pellets.

Optionally, the carbon-containing material, e.g., graphitized or non-graphitized carbon or composite particles, has a first BET nitrogen surface area (also called $N_2SA$). In various optional embodiments, the first BET nitrogen surface area is less than about 1000 $m^2/g$, e.g., less than about 500 $m^2/g$, less than about 300 $m^2/g$, or less than about 100 $m^2/g$. The high surface area carbon (optionally high surface area graphitized carbon) formed in the oxidizing step, optionally in a fluidized bed reactor reaction system, preferably has a second BET nitrogen surface area that is greater than the first BET nitrogen surface area.

The degree of mesoporosity vs. microporosity of highly etched carbon black may be characterized by the ratio of the BET nitrogen surface area to statistical thickness surface area (STSA). BET nitrogen surface area generally reflects the total surface area of the carbon black, i.e., including the external surface area and surface area attributable to mesopores and micropores, while STSA surface area generally reflects only the external surface area and the surface area of the carbon black that is attributable to mesopores (i.e., excluding surface area attributable to micropores). As used herein, the term "STSA Surface Area" means the surface area as determined as per ASTM D6556-04, the entirety of which is incorporated herein by reference. Generally, the more similar the BET nitrogen and STSA surface areas (i.e., as the ratio of the two approaches 1), the less microporous the carbon black. In some exemplary embodiments, the carbon black starting material has a BET nitrogen surface area/STSA ratio that is greater than 0.9, e.g., greater than about 1.1, greater than about 1.3, or greater than about 1.5. During the oxidizing process of the present invention, microporosity (and hence the BET nitrogen surface area/STSA ratio) may initially increase, but ultimately will decrease as the microporous structure is oxidized and the carbon black particles are "hollowed out," as described below with reference to FIG. 7. During the oxidation step, the BET nitrogen surface area/STSA ratio ideally approaches 1.

Fluidizing Agent

If oxidizing is employed to increase the surface area of the carbon-containing material, the process preferably comprises a step of fluidizing the carbon-containing material (e.g., starting carbon material or graphitized carbon) in a fluidized bed with a fluidizing agent comprising an oxidant and optionally a diluent such as nitrogen.

The composition of the oxidant may vary widely depending, for example, on the composition of the carbon black starting material that is employed and on the desired reaction conditions. In some non-limiting embodiments, the oxidant comprises one or more oxygen-containing agents such as $O_2$, air, $O_3$, water (e.g., steam), or $CO_2$. In some particularly preferred embodiments, the oxidant comprises, consists of, or consists essentially of steam. Preferably, the fluidizing agent comprises at least 50 wt. % steam, at least 75 wt. % steam, at least 90 wt. % steam or 100% steam.

Optionally, the fluidizing agent further comprises a diluent, i.e., a material that is included in the fluidizing agent primarily for a reason other than to oxidize the carbon black starting material. For example, the diluent may comprise an inert gas, e.g., nitrogen or argon. Thus, the fluidizing agent optionally further comprises an inert gas, e.g., nitrogen or argon. During start up, the fluidizing agent may comprise the diluent and little or no oxidant. By employing a fluidizing agent containing diluent but little or no oxidant, the carbon-containing material may be fluidized with the diluent while the temperature profile of the fluidized bed reactor is adjusted (i.e., as the bed is heated) to make the reaction thermodynamically favorable. Once the desired temperature profile is achieved, the oxidant content of the fluidizing agent may be increased to provide the desired oxidant: diluent ratio and the reaction proceeds. A similar procedure may be employed for reactor shut-down.

Desirably, the oxidation rate of the process of the present invention may be carefully controlled by controlling the ratio of oxidant to diluent (e.g., nitrogen) in the fluidizing agent during the step of contacting the carbon-containing material with the oxidant in the fluidized bed under conditions effective to form the high surface area (optionally graphitized) carbon. As a result, the second BET nitrogen surface area of the high surface area (optionally graphitized) carbon formed according to the processes of the present invention may be carefully controlled by controlling the ratio of oxidant to diluent (e.g., nitrogen) in the fluidizing agent.

Oxidizing Conditions

It has now been discovered that carbon black may be effectively oxidized to increase its surface area in a fluidized bed reactor. Fluidized bed reactors provide the benefit, as compared to other reactor types, of improving the contacting of the oxidant with the carbon-containing material, e.g., starting carbon material or graphitized carbon, which leads to faster reaction times and more homogenous etching of the carbon black starting material in forming the carbon black product. In a preferred embodiment, as indicated above, the oxidizing comprises a steam-etching process. In another preferred embodiment, particularly where the carbon material is a partially graphitized carbon, the oxidizing medium comprises oxygen.

A fluidized bed reactor typically comprises a fluidizing agent introduction zone or plenum, and a reaction zone (oxidation zone) or bed disposed above the fluidizing agent introduction zone. During operation, the carbon-containing material is fluidized in the oxidation zone (e.g., etching zone) to form a fluidized bed. The two zones are preferably separated by a base grate, screen, plate, or similar separation structure, which comprises a plurality of openings to allow the fluidizing agent to flow from the fluidizing agent introduction zone to the oxidation or etching zone (fluidized bed) while substantially eliminating flow of the carbon-containing material from the etching zone to the fluidizing agent introduction zone.

Figure 7:
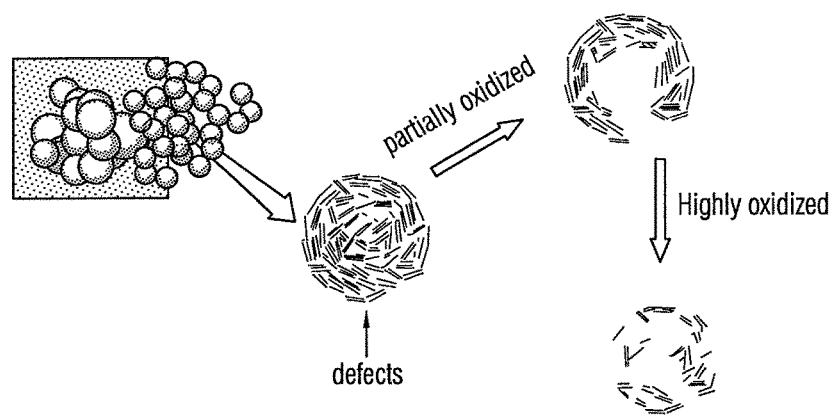
FIG. 7 illustrates how carbon surface area increases through steam etching by the removal of amorphous part of the carbon black particles

Without being bound by theory, the process of the invention is believed to increase surface area by removing, for example, active sites such as defects, amorphous carbon, single layer planes, etc., from the carbon black starting material. This process is illustrated in FIG. 7, which shows the removal of amorphous carbon to form highly oxidized, high surface area carbon, optionally with a high graphitization level. In FIG. 7, a primary particle (carbon-containing material) is depicted as having a concentric crystallite mode, which is represented by a "shell" that comprises larger, more perfect crystallites having layered planes that are oriented generally parallel to the particle surface. The center region or "core" of the particle comprises primarily small, imperfect crystallites, single-layer planes and possibly disorganized carbon that is not incorporated into the layered planes. In addition, there are some active sites (of higher energy) on the carbon surface such as defects, functional groups, etc. During the process of the invention, the oxidant molecules (e.g., water molecules) first attack the active sites on the carbon surface and remove the carbon atoms from the surface and form gas phase CO or $CO_2$ and hydrogen (see equations 1-2, below), resulting in the exposure of more carbon atoms. Since the carbon atoms in the core of the particles tend to have higher energy than those on the surface, the oxidizing (e.g., etching) rates tend to be faster in the core of the particles than on the surface.

More specifically, for steam etching, without being bound by theory, the carbon-containing material (e.g., starting carbon material or graphitized carbon) is converted to high surface area (which optionally has been previously graphitized) carbon in a reaction mechanism that is similar to steam reforming. The products of steam etching comprise CO and hydrogen and/or $CO_2$ and hydrogen. The relative content of CO and $CO_2$ is dependent on the ratio of steam to carbon and temperature. For example, higher steam to carbon ratios favor $CO_2$ and hydrogen production. The relevant steam etching reactions are as follows:

$$C + H_2O \rightarrow CO + H_2 \tag{1}$$

$$CO + H_2O \rightarrow CO_2 + H_2 \tag{2}$$

If steam etching is employed as the oxidizing step, the steam etching preferably comprises fluidizing the carbon-containing material (e.g., starting carbon material or graphitized carbon) in a fluidized bed reactor with a fluidizing agent comprising steam. As indicated above, the fluidizing agent may comprise one or more additional components, e.g., an inert gas such as nitrogen or argon. By controlling the ratio of steam to diluent that is fed to the fluidized bed reactor, the degree of steam etching of the carbon black starting material desirably can be carefully controlled. The degree of steam etching of the carbon black can also be controlled by the ratio of steam flow rate to carbon, with higher steam flow rate to carbon ratios favoring greater etching.

The specific conditions employed in the fluidized bed reactor will vary depending on factors such as the physical properties of the carbon black starting material and, in particular, the fluidizability of the carbon-containing material. Additional factors impacting the desired conditions for the fluidized bed reactor include the fluidization plate design as well as the design of the fluidized bed reactor employed.

Another important parameter in controlling the rate and degree of oxidization in the fluidized bed reactor is the temperature of the fluidized bed. Generally, the greater the bed temperature, the faster the rate of oxidation will be. The steam etching process preferably takes place at a temperature greater than about 700° C. due to the highly endothermic nature of the reactions ($\Delta H_{300K}$=31.4 kcal/mol). In some non-limiting embodiments, the bed temperature is greater than about 700° C., e.g., greater than about 900° C. or greater than about 1000° C. In terms of ranges, the bed temperature optionally is from about 700° C. to about 1400° C., e.g., from about 700° C. to about 1300° C., e.g., from about 900° C. to about 1100° C. or from about 1000° C. to about 1100° C. As used herein, the term "bed temperature" means the average temperature of the bed during the step of contacting the carbon black starting material with the oxidant, e.g., steam, in the fluidized bed under conditions effective to form the carbon black product.

The superficial velocity at which the fluidizing agent is introduced into the fluidized bed is another important factor in controlling the degree of contacting between the oxidant and the carbon-containing material (e.g., starting carbon material or graphitized carbon). Ideally, the superficial velocity is sufficiently high so as to cause the carbon-containing material contained in the fluidized bed to behave in a fluidized manner, but not so high as to entrain the carbon-containing material and thereby carry the carbon out of the fluidized bed reactor. In some non-limiting embodiments, the fluidizing agent has a superficial velocity in the fluidized bed of from about 0.03 to about 0.15 m/s, e.g., from about 0.05 to about 0.13 m/s or from about 0.05 to about 0.10 m/s.

The degree of oxidation of the carbon-containing material that is desired to form the high surface area (optionally graphitized) carbon is generally proportional to the mass ratio of cumulative oxidant at the end of the reaction time to carbon black starting material. In some exemplary non-limiting embodiments, the mass ratio of cumulative oxidant at the end of the reaction time to carbon black starting material is from about 0.5 to about 3, e.g., from about 0.5 to about 2.5, from about 0.5 to about 2 or from about 1 to about 2. A similar parameter is the ratio of steam flow to carbon-containing material in the fluidized bed, which preferably is from about 0.05 to about 0.50 kg steam/kg carbon-containing material/hour, e.g., from about 0.1 to about 0.4 kg steam/kg carbon black starting material/hour, or from about 0.2 to about 0.3 kg steam/kg carbon-containing material/hour.

The reaction time employed in forming the high surface area (optionally graphitized) carbon from the carbon-containing material will vary depending, for example, on the desired difference in surface area and porosity between the carbon-containing material and the high surface area carbon, the temperature of the fluidized bed reactor, the superficial gas velocity of the fluidizing agent, the oxidant content of the fluidizing agent, the mass loading of the carbon black staring material, and other parameters well within the knowledge of those skilled in the art of fluidized bed reaction processes. In some non-limiting embodiments, the conditions comprise a reaction time of from about 0.5 to about 24 hours, e.g., 0.5 to about 15 hours, from about 2 to about 12 hours or from about 3 to about 9 hours.

The degree of oxidation of the carbon-containing material (e.g., starting carbon material or graphitized carbon) that is desired as well as the reaction time will depend, among other things, on the desired difference between the second BET nitrogen surface area of the high surface area carbon and the first BET nitrogen surface area of the carbon-containing material, e.g., the carbon black starting material or the graphitized carbon. In some non-limiting exemplary embodiments, the conditions, e.g., one or more of the reaction time, the bed temperature, the oxidant content of the fluidizing agent, etc., are controlled such that the second BET nitrogen surface area is greater than the first BET nitrogen surface area by a factor of at least about 1.2, at least about 1.5, at least about 2.0, at least about 4.0, or at least about 8.0. In terms of ranges, the conditions optionally are controlled such that the second BET nitrogen surface area is greater than the first BET nitrogen surface area by a factor of from about 1.5 to about 8.0, e.g., from about 3.0 to about 8.0 or from about 5.0 to about 8.0. Optionally, the difference between the second BET nitrogen surface area and the first BET nitrogen surface area is greater than about 100 m$^2$/g, e.g., greater than about 200 m$^2$/g, greater than about 300 m$^2$/g, greater than about 400 m$^2$/g, greater than about 500 m$^2$/g, greater than about 800 m$^2$/g, greater than about 1000 m$^2$/g or even greater than about 1200 m$^2$/g.

The oxidizing (e.g., steam etching) step optionally is performed at elevated pressure. The partial pressure of the oxidant (e.g., steam) employed in the oxidizing process, e.g., within the fluidized bed reactor, may vary over a wide range. Typically, the partial pressure employed in the process is in the range of from about 0.1 to about 1, e.g., from about 0.2 to about 0.8 or from about 0.3 to about 0.7 atmospheres.

Optionally, the oxidizing is conducted in the presence of a catalyst. If employed, the catalyst optionally comprises, for example, a metal oxide (such as, for example, NiO, CuO, Fe$_2$O$_3$), a metal nitrate (such as, for example, Ni(NO$_3$)$_2$, Cu(NiO$_3$)$_2$), or a metal hydroxide (such as, for example, Fe(OH)$_3$, NaOH, KOH and Ca(OH)$_2$), or an alkali earth metal salt (either with an organic anion or an inorganic anion) such as calcium acetate, calcium formate, calcium chloride, barium acetate, barium formate, or barium chloride. If a catalyst is employed, the weight ratio of catalyst to carbon optionally is from about 0.0001 to about 0.5, e.g., from about 0.001 to about 0.1 or from about 0.005 to about 0.05.

During the oxidation, e.g., steam etching, process, samples of the carbon material contained in the fluidized bed may be obtained and analyzed to determine if the desired increase in surface area has been achieved. In a preferred embodiment, a separation device such as a cyclone that is in fluid communication with the fluidized bed (e.g., through a conduit) periodically samples the carbon black contained therein. The etching level of a given sample can be estimated by manually measuring the oil absorption (i.e. DBP or dibutylphthalate absorption) number in terms of cc/100 g carbon black in a manner similar to that described in ASTM D2414-06a but optionally using a manual (i.e. hand) mixing method rather than a machine. For example, a target manual oil absorption number between about 400 and about 750 cc/100 g may be desirable (this target number corresponds to a BET surface area for Vulcan XC72 carbon black of about 800 to about 1500 m$^2$/g). After the desired increase in surface area has been achieved, the resulting high surface area (optionally graphitized) carbon is removed from the steam etching device, typically by stopping the flow of the fluidizing agent, allowing the bed to cool under flow of pure nitrogen or other inert gas, and then removing the high surface area carbon, for example, through the fluidizing agent introduction zone and through a product outlet that is in communication with the fluidizing agent introduction zone.

Figure 6:
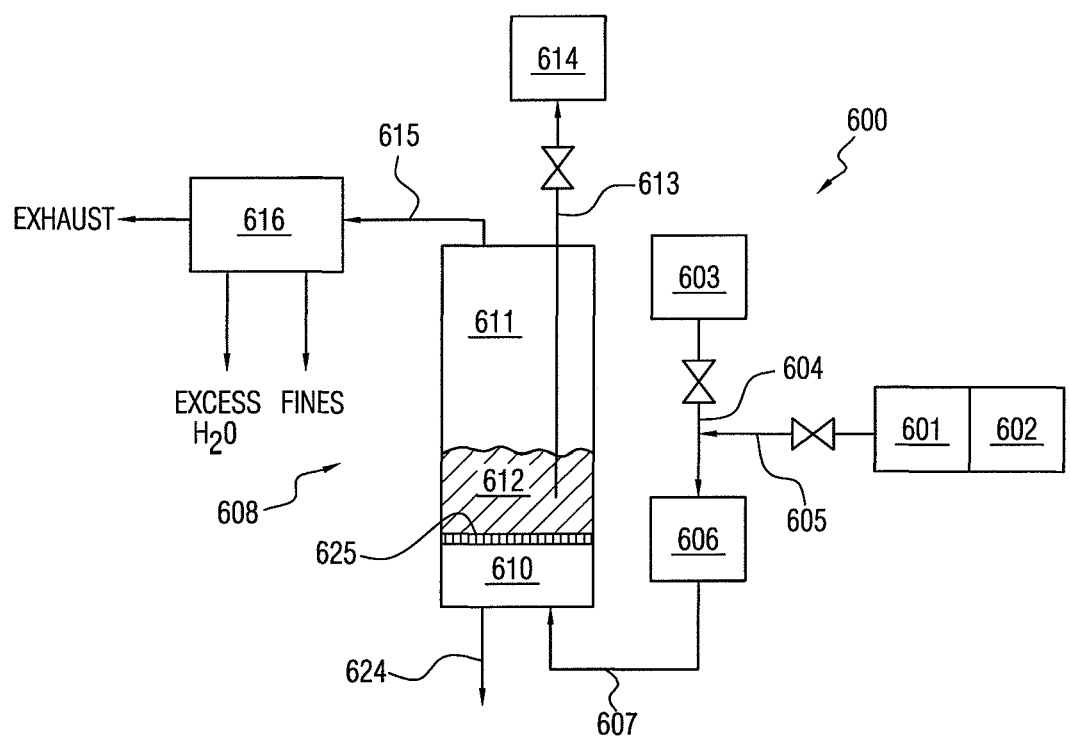
FIG. 6 presents a flow diagram of a steam etching system according to one aspect of the present invention.

FIG. 6 provides a flow diagram of an exemplary fluidized bed reactor system 600 according to one embodiment of the present invention. Steam etching system 600 comprises a fluidized bed reactor 608, which comprises a fluidizing agent introduction zone or plenum 610 and an oxidation or etching zone 611, which zones are separated from one another by base screen or grate 625. During normal operation, etching zone 611 includes a fluidized bed 612, which comprises the carbon-containing material and optionally catalyst. The etching zone 611 preferably is heated by one or more heaters to provide the desired temperature profile.

As shown, if the fluidizing agent comprises steam and/or a substantially inert fluidizing agent (e.g., $N_2$)., the steam is preferably provided by steam generator 601 (facilitated by pump 602), and the substantially inert fluidizing agent is provided by substantially inert fluidizing agent source 603. The substantially inert fluidizing agent and the steam (controlled by valves to provide the desired ratio) are directed through conduits 604 and 605, respectively, and combined prior to introduction into gas preheater 606, which preferably increases the temperature of the fluidizing agent prior to introduction into the fluidized bed reactor 608 in order to facilitate the steam etching process.

After preheating in gas preheater 606, the fluidizing agent is directed through conduit 607 to the fluidizing agent introduction zone or plenum 610. The positive pressure of the fluidizing agent being introduced into the fluidizing agent introduction zone or plenum 610 causes the fluidizing agent to pass through openings in the screen or grate 625 and enter the oxidation or etching zone 611. As the fluidizing agent enters the oxidation or etching zone 611, it fluidizes the carbon black and optional catalyst in fluidized bed 612. Additionally, as fluidizing agent enters the oxidation or etching zone 611, excess oxidant (e.g., steam), gaseous byproducts, and some amount of entrained fines are removed from the top of the fluidized bed reactor 608 through conduit 615 and directed to separation system 616, which may comprise one or more separation devices, e.g., cyclones, bag houses, filters, etc, in order to separate fines from the gaseous byproducts.

As shown, a sampling device 614 is in fluid communication with the fluidized bed 612 through conduit 613 and periodically samples the carbon material contained therein to determine if the desired degree of oxidation has been achieved. After the desired increase in surface area has been achieved, the resulting high surface area carbon is removed from the fluidized bed reactor by stopping the flow of the fluidizing agent, allowing the bed to cool under flow of pure nitrogen or other inert gas, and then removing the carbon black product through the fluidizing agent introduction zone 610 and through product outlet 624 that is in communication with the fluidizing agent introduction zone 610.

Figure 8A:
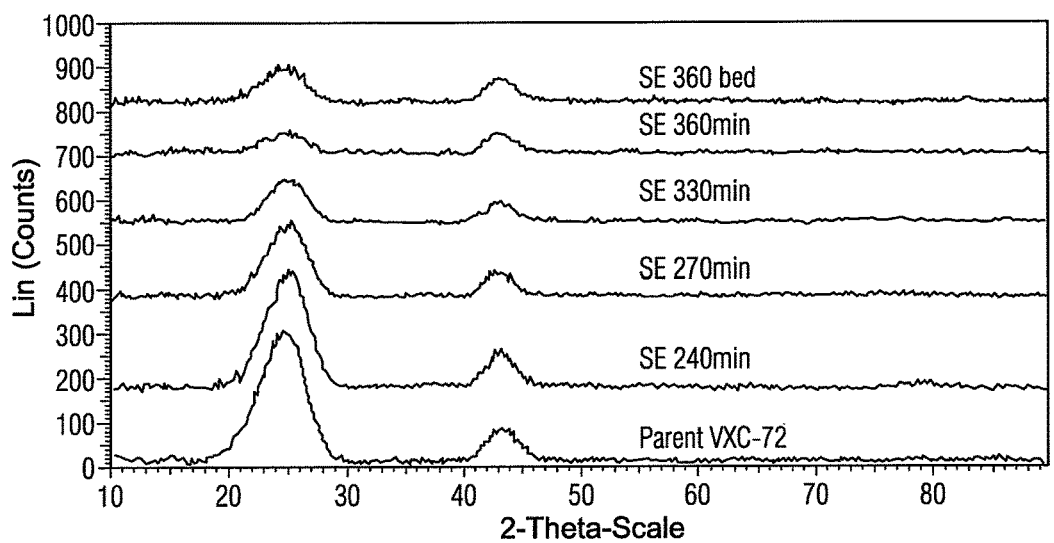
FIGS. 8A-8C present XRD profiles of steam etched carbon blacks as a function of etching time.
Figure 8B:
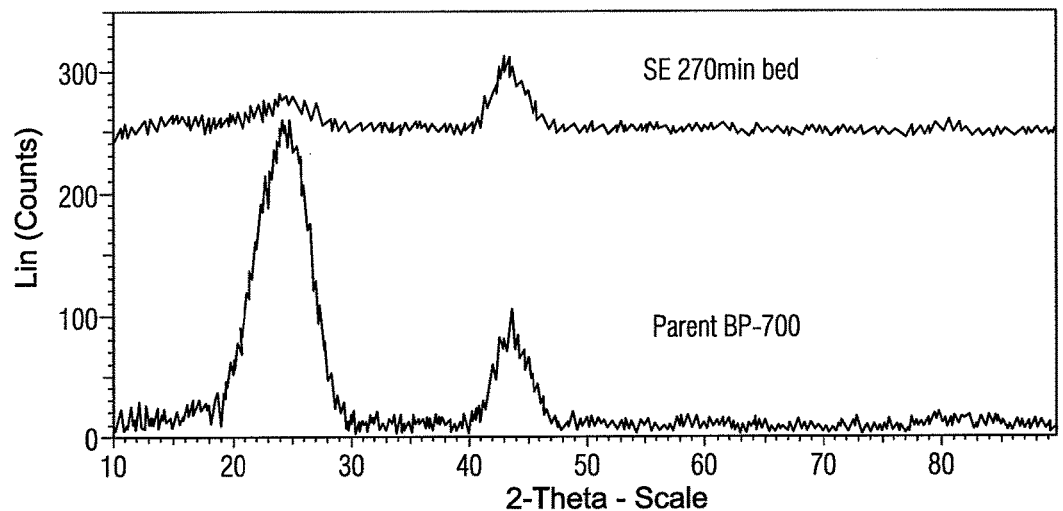
Figure 8C:
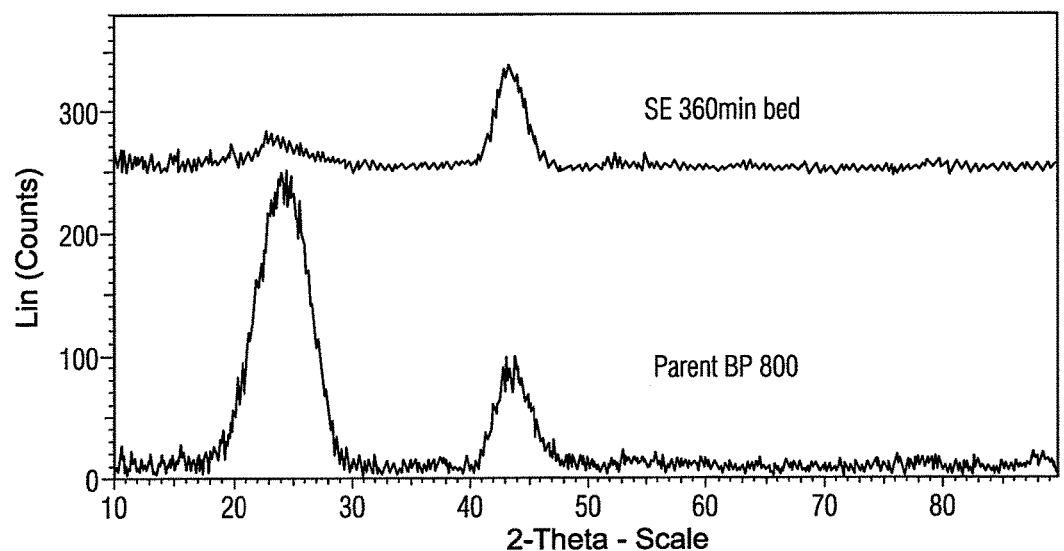
Figure 9:
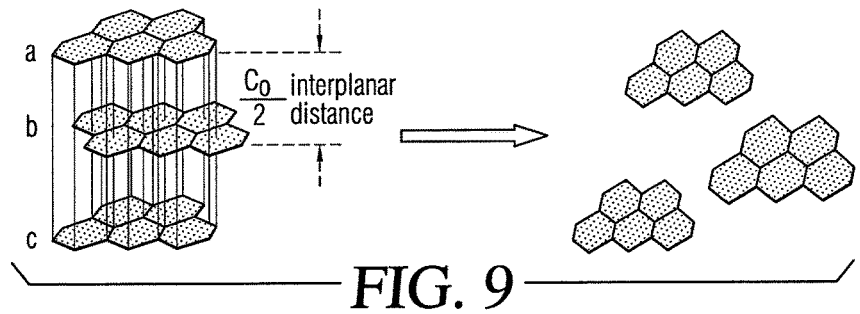
FIG. 9 illustrates a non-limiting possible change in carbon microstructure as steam etching progresses.

FIGS. 8A-8C present XRD patterns of steam etched carbon as a function of etching time. As shown, regardless of carbon type, the (002) diffraction peak was generally sensitive to steam etching. This sensitivity is reflected by the significant decrease in the (002) peak intensity as steam etching progressed. In contrast, the intensity of the (10) diffraction peak was minimally affected by the steam etching process. The peak at (002) reflects the three-dimensional order of carbon, while the peak at (10) is more related to layered planes. Without being bound by theory, these results suggest that the order of long range lattice orientation is destroyed during etching or that the layered planes become more disoriented as etching progresses, as illustrated in FIG. 9.

Figure 10:
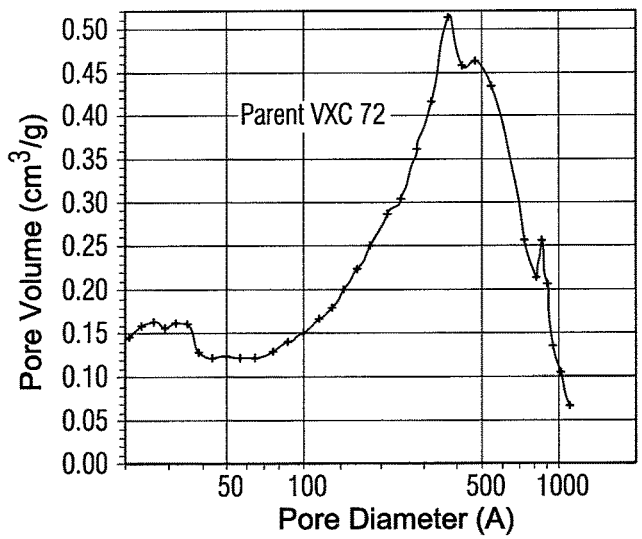
FIG. 10 presents the pore size distribution for carbon black (VXC 72) before steam etching.
Figure 11:
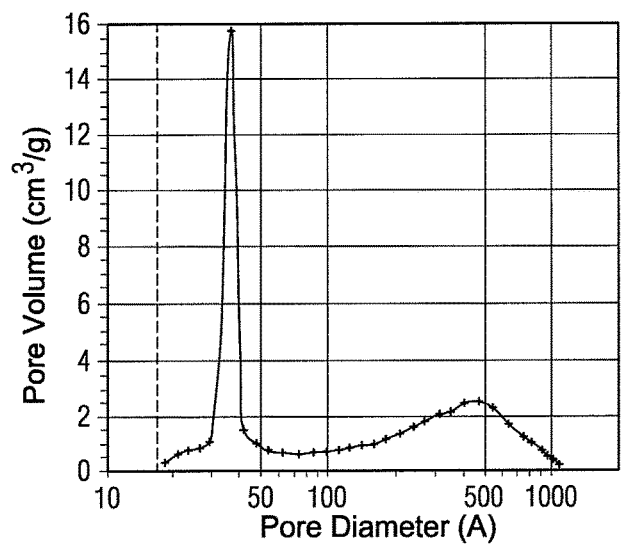
FIG. 11 presents the pore size distribution for carbon black (VXC 72) after steam etching at 950° C. for 245 minutes.

FIGS. 10 and 11 present pore size distributions for carbon black (VXC 72) before (FIG. 10) and after (FIG. 11) steam etching at 1000° C. for 245 minutes. As shown in FIG. 10, the average pore size of the parent (non-steam etched) carbon black was on the order of about 10 to about 100 nm. Since the primary particles were on the order of 30 nm, these pores are primarily interpores formed between the aggregates. During steam etching, micro- and meso-pores were created by the removal of the carbon atoms from the particles. As shown in FIG. 11, most of the pores created by steam etching had an average pores size on the order of about 3 to about 5 nm, although a fraction of pores larger than 50 nm was also formed. This result has been confirmed with Hg porosimetry.

Although the above-described oxidation process has been described with reference to steam as the oxidizing agent, the same or similar process may be employed with other oxidizing agents, such as, for example, $O_2$, air, $NO_x$, or $CO_2$, or mixtures thereof such as $CO_2/H_2O$, air/$H_2O$, etc. For the sake of brevity, the above description of the optional steam etching process is incorporated herein by reference as if it referred to each of these respective oxidizing agents instead of steam. Of course, other oxidizing agents may be employed to increase the surface area of the carbon-containing material and the methods may be different from fluidized bed such as the use of conventional ovens such as box and tunnel furnaces, rotary calciners, etc.

B. Template Phase Removal

In another embodiment, the surface area of the carbon-containing material is increased by removing a template phase therefrom, preferably after a carbonization step in which a carbon precursor is converted to a carbon phase comprising pores that are formed by the template phase. In this embodiment, the carbon-containing material preferably comprises composite particles, preferably carbonized composite particles that include a carbon phase and a template phase.

As indicated above, the graphitizing step may occur before or after the step of removing the template from the composite particles. Thus, in one aspect, the process comprises a step of removing the template phase from composite particles to form high surface area carbon particles, and the high surface area carbon particles are subsequently graphitized to form high surface area graphitized carbon particles. In another aspect, the process comprises first graphitizing composite particles to form graphitized composite particles, followed by removing the template phase from the graphitized composite particles to form high surface area graphitized carbon particles.

In one embodiment, the step of removing the template comprises mixing the composite particles, graphitized or non-graphitized, with one or more template removal mediums under conditions effective for the template to dissolve therein and be liberated from the composite particles and forming pores in a carbon matrix. The template removal medium preferably comprises water and may comprise an acidic or basic aqueous solution. After removal of the template, the resulting particles, which preferably are substantially template free, are filtered and washed, with optionally multiple filtering and washing steps.

In one aspect, the template removal medium comprises a basic aqueous solution. The specific basic solution employed may vary widely. In some preferred aspects, the basic solution comprises NaOH, $NH_4OH$ or KOH dissolved in water. The concentration of the basic solution may range, for example, from about 0.1 to about 20 M, e.g., from about 1 to about 10 M or from about 2 to about 5 M.

Alternatively, the template removal medium comprises an acidic aqueous solution. The specific acidic solution employed may vary widely. In some preferred aspects, the acidic solution comprises HF, HCl, $H_2SO_4$, $HNO_3$ dissolved in water. The concentration of the acidic solution may range, for example, from about 0.1 to about 20 M, e.g., from about 0.5 to about 15 M or from about 2 to about 10 M.

In those aspects of the invention that employ composite particles, the invention optionally further comprises steps for either or both (1) forming precarbonized composite particles and/or (2) carbonizing the precarbonized composite particles to form carbonized composite particles. By precarbonized composite particles it is meant particles comprising a carbon precursor and a template phase. In the optional carbonizing step, the carbon precursor is converted to a carbon phase, which preferably includes voids that are formed by the presence of the template phase. Ultimately, during the template removal step, these voids are converted to pores in a carbon phase to form a mesoporous carbon phase. For example, in the processes of the invention that include a step of removing a template phase from composite particles, e.g., carbonized composite particles, the processes optionally further comprise the steps of: (i) mixing template particles, e.g., silica particles, having a porous structure with a carbon precursor under conditions effective for the carbon precursor to infiltrate the porous structure of the template particles; and (ii) converting the carbon precursor to carbon within the porous structure of the porous silica particles to form the composite particles. The carbon phase thus formed optionally comprises carbon black, amorphous carbon and/or partially graphitized carbon.

The specific processes employed for forming the precarbonized composite particles may vary widely. In one aspect, the precarbonized composite particles are synthesized by filling a template phase with a carbon precursor. In this aspect, the carbon precursor preferably is disposed in a liquid vehicle that allows for the carbon precursor to infiltrate the pores of the template particles.

The template phase preferably comprises porous particles, e.g., porous ceramic particles. In some non-limiting embodiments, the template phase comprises, for example, silica, titania, MCM-48, or SBA-15 with pore size in the range of 0.5 nm to 10 nm.

The carbon precursor preferably comprises an organic compound capable of infiltrating the pores of the template phase and preferably being readily decomposable to form a carbon phase, optionally at elevated temperatures. In some non-limiting embodiments, for example, the carbon precursor comprises sucrose, phenol resin or furfuryl alcohol, or any kind of hydrocarbon polymer.

The step of carbonizing the precarbonized composite particles to form carbonized composite particles preferably comprises treating the precarbonized composite particles at an elevated temperature under conditions effective to convert the carbon precursor in the precarbonized composite particles to a carbon phase. The elevated temperature may range, for example, from 50 to 2500° C., e.g., from 100 to 1500° C. or from 300 to 1200° C. for a time period ranging, for example, from 0.5 to 100 hours, e.g., from 0.5 to 50 hours or from 0.1 to 10 hours.

After the precarbonized composite particles are converted to carbonized composite particles, the template phase preferably is removed, as described above.

For further discussion of processes for forming and carbonizing composite particles and removing templates therefrom, see J. E. Hampsey et al., "Templating synthesis of ordered mesoporous carbon particles," 43 Carbon 2977-2982 (2005); K. Böhme et al., "Templated synthesis of mesoporous carbon from sucrose—the way from the silica pore filling to the carbon material," 43 *Carbon* 1918-1925 (2005); R. Ryoo et al., "Synthesis of highly ordered carbono molecular sieves via template mediated structural transformation," 100(37) *J. Phys. Chem. B.* 7743-6 (1999); and T. Kyotani, "Control of pore structure in carbon," 38 Carbon 269-286 (2000), the entireties of which are incorporated herein by reference.

Catalyst Formation

As indicated above, in some embodiments, the invention is directed to catalyst particles comprising high surface area graphitized carbon and an active phase disposed thereon, as well as to processes for forming such catalyst particles.

Many processes are known for forming catalyst particles comprising a carbon black support phase and an active phased disposed thereon. In a preferred embodiment, the catalyst particles are formed in a spray conversion reactor. In this embodiment, a liquid mixture is formed comprising carbon support particles, i.e., the above-described high surface area graphitized carbon, an active phase precursor, and a liquid vehicle. The liquid mixture is sprayed at elevated temperatures under conditions effective to vaporize the liquid vehicle and convert the active phase precursor to active phase disposed on the carbon support particles. Such processes are described, for example, in U.S. Patent Application Publication No. 2007/0160899 A1, Published Jul. 12, 2007, the entirety of which is incorporated herein by reference. See also U.S. patent application Ser. No. 11/756,997, filed Jun. 1, 2007, the entirety of which is incorporated herein by reference.

In a particularly preferred embodiment, the invention is to a process for forming catalyst particles, the process comprising the steps of: (a) providing a precursor medium comprising a first metal precursor, a liquid vehicle, and a substrate precursor comprising high surface area graphitized carbon; (b) spray converting, e.g., spray drying, the precursor medium to vaporize at least a portion of the liquid vehicle and form intermediate particles; and (c) heating the intermediate particles to a temperature effective (e.g., from about 250 to about 750° C.) to form catalyst particles comprising an active phase (preferably comprising active phase nanoparticles, e.g., particles having an average particle size of less than 150 nm, less than 50 nm, less than 25 nm, less than 10 nm, less than 8 nm, less than 5 nm or less than 3 nm) disposed on the high surface area graphitized carbon. The precursor medium optionally comprises one or more additional metal precursors if, for example, it is desired to form an alloy active phase on the high surface area graphitized carbon.

In another embodiment, the invention is to a process for forming catalyst particles, wherein the process comprises the steps of: (a) providing a precursor medium comprising a first metal precursor, a liquid vehicle and a substrate precursor comprising high surface area graphitized carbon; (b) aerosolizing the precursor medium to form a flowable aerosol comprising droplets of the liquid mixture; and (c) heating the flowable aerosol to a temperature of from about 250 to about 750° C. under conditions effective to at least partially vaporize the liquid vehicle and form the catalyst particles, wherein the catalyst particles comprise an active phase (preferably comprising nanoparticles) disposed on the high surface area graphitized carbon. The precursor medium optionally comprises one or more additional metal precursors if, for example, it is desired to form an alloy active phase on the high surface area graphitized carbon.

In addition to spray conversion processes, in another embodiment, the catalyst particles are formed through wet precipitation techniques, well known to those skilled in the art.

The active phase may vary widely. In a preferred embodiment, the active phase comprises platinum or any other of the noble metals, as these materials are most active and best able to withstand the corrosive environment of fuel cells. In another embodiment, the active phase comprises one or more alloys, e.g., alloys of noble metals. Some exemplary catalytic alloys are disclosed, for example, in U.S. Pat. No. 4,186,110 (Pt—Ti, Pt—Al, Pt—Al—Si, Pt—Sr—Ti, Pt—Ce), in U.S. Pat. No. 4,316,944 (Pt—Cr) and U.S. Pat. No. 4,202,934 (Pt—V), the entireties of which are incorporated herein by reference.

In another embodiment, the active phase comprises a ternary alloy catalyst. U.S. Pat. No. 4,447,506, for example, discloses a ternary noble metal-containing alloy catalyst which has a catalytic activity for the electro-chemical reduction of oxygen greater than two and one-half times that of the support unalloyed noble metal alone. Similarly, U.S. Pat. Nos. 4,677,092 and 4,711,829 disclose ternary alloy catalysts for the electrochemical reduction of oxygen, the catalysts having an ordered structure to improve stability and the specific activity of the catalysts. U.S. Pat. No. 4,794,054 discloses Pt—Fe—Co ternary alloy with face centered cubic lattice structure and U.S. Pat. No. 4,970,128 discloses Pt—Fe—Cu ternary ordered alloy. U.S. Pat. No. 5,068,161 discloses several Pt—Ni and Pt—Mn catalyst systems in addition to Pt—Co—Cr ternary alloy catalyst systems. U.S. Pat. No. 5,189,005 discloses a platinum alloy catalyst comprising an electroconductive support and Pt—Ni—Co alloy particles having an ordered structure supported thereon. Each of these patents is incorporated herein by reference in its entirety.

Since the active phase may vary widely, the active phase precursor that is employed may also vary widely. Table 1 shows some non-limiting examples of some compounds that may be used as active phase precursors, and that would normally undergo reaction to form the corresponding metal or metal oxide prior to or during formation of the catalyst particles, for example in a spray conversion process. The target materials for which each listed metal precursor provides a component is also listed in Table 1.

TABLE 1

EXEMPLARY ACTIVE PHASE PRECURSORS

| TARGET MATERIAL | EXAMPLES OF ACTIVE PHASE PRECURSORS |
|---|---|
| Platinum | Tetraamine platinum hydroxide ($Pt(NH_3)_4(OH)_2$), chloroplatinic acid ($H_2PtCl_6 \cdot xH_2O$); tetraamineplatinum (II) nitrate ($Pt(NH_3)_4(NO_3)_2$); hydroxoplatinic acid ($H_2Pt(OH)_6$); platinum nitrates; platinum amine nitrates; platinum tetrachloride ($PtCl_4$); sodium hexahydroxyplatinum ($Na_2Pt(OH)_6$); potassium hexahydroxyplatinum ($K_2Pt(OH)_6$) and $Na_2PtCl_4$ |
| Palladium | Tetraamine palladium nitrate ($Pd(NH_3)_4(NO_3)_2$); palladium (II) chloride ($PdCl_2$); palladium (II) nitrate ($Pd(NO_3)_2$); $H_2PdCl_4$; $Na_2PdCl_4$; $Pd(NH_3)_4Cl_2$; $Pd(NH_3)_2(OH)_2$ and palladium carboxylates |
| Ruthenium | ruthenium β-diketonates; ruthenium nitrosyl nitrate ($Ru(NO)(NO_3)_3$); potassium perruthenate ($K_3RuO_4$); sodium perruthenate ($Na_3RuO_4$); $(NH_4)_3Ru_2O_7$; $NH_4Ru_2O_7$; $Ru_3(CO)_{12}$ and ruthenium chloride ($RuCl_3$) |
| Gold | gold chloride ($AuCl_3$) and ammonium tetrachloroaurate (($NH_4)AuCl_4$); hydrogen tetrachloroaurate trihydrate |
| Copper | copper carboxylates; copper acetate($Cu(OOCH_3)_2$); copper chloride ($CuCl_2$); copper nitrate ($Cu(NO_3)_2$), and copper perchlorate ($Cu(ClO_4)_2$) |
| Rhodium | rhodium chloride hydrate ($RhCl_3 \cdot xH_2O$); ammonium hexachlororhodium hydrate (($NH_4)3RhCl6 \cdot xH_2O$) and rhodium nitrate ($Rh(NO_3)_3$) |
| Titanium | titanium (III) chloride ($TiCl_3$); titanium (IV) chloride ($TiCl_4$) and tetrachlorodianimmo titanium ($TiCl_4(NH_3)_2$) |
| Vanadium | vanadium (III) chloride ($VCl_3$); vanadium (IV) chloride ($VCl_4$); vanadium fluoride ($VF_4$) and ammonium vanadium oxide ($NH_4VO_3$) |
| Manganese | manganese (II) acetate hydrate ($Mn(OOCCH_3)_2 \cdot xH_2O$); manganese (III) acetate hydrate ($Mn(OOCCH_3)_2 \cdot xH_2O$); manganese chloride hydrate ($MnCl_2 \cdot xH_2O$); manganese nitrate ($Mn(NO_3)_2$) and potassium permangate ($KMNO_4$) |
| Iron | iron acetate ($Fe(OOCCH_3)_2$); iron chloride hydrate ($FeCl_2 \cdot xH_2O$); iron chloride hydrate ($FeCl_3 \cdot xH_2O$); iron nitrate hydrate ($Fe(NO_3)_3 \cdot xH_2O$); iron (II) perchlorate hydrate ($Fe(ClO_4)_2 \cdot xH_2O$) and iron (III) perchlorate hydrate ($Fe(ClO_4)_3 \cdot xH_2O$) |
| Cobalt | cobalt acetate hydrate ($Co(OOCCH_3)_2 \cdot xH_2O$); cobalt chloride hydrate ($CoCl_2 \cdot xH_2O$) and cobalt nitrate hydrate ($Co(NO_3)_2 \cdot xH_2O$) |
| Tungsten | tungsten oxychloride ($WOCl_4$) and ammonium tungsten oxide (($NH4)_{10}W_{12}O_{41}$) |
| Zinc | zinc acetate ($Zn(OOCCH_3)_2 \cdot xH_2O$); zinc chloride ($ZnCl_2$); zinc formate ($Zn(OOCH)_2$) and zinc nitrate hydrate ($Zn(NO_3)_2 \cdot xH_2O$). |
| Zirconium | zirconium chloride ($ZrCl_4$); zirconium hydride ($ZrH_2$) and zirconium dinitrate oxide ($ZrO(NO_3)_2 \cdot xH_2O$) |
| Niobium | niobium chloride ($NbCl_5$) and niobium hydride (NbH) |
| Molybdenum | molybdenum chloride; molybdenum hexacarbonyl ($Mo(CO)_6$); ammonium paramolybdate (($NH_4)Mo_7O_{24} \cdot xH_2O$); ammonium molybdate (($NH_4)_2Mo_2O_7$) and molybdenum acetate dimer ($Mo[(OCOCH_3)_2]_2$) |
| Tin | $SnCl_4 \cdot xH_2O$ |
| Osmium | $OsCl_3$ |
| Nickel | Ni-nitrate ($Ni(NO_3)_2$); Ni-sulfate ($NiSO_4$); Nickel ammine complexes ($[Ni(NH_3)_6]^{n+}$ (n = 2,3)); Ni-acetylacetonate ($[Ni(acac)_2]_3$ or $Ni(acac)_2(H_2O)_2$); Ni-hexafluoroacetylacetonate ($Ni[CF_3COCH=C(O—)CF_3]_2$); Ni-formate ($Ni(O_2CH)_2$); Ni-acetate ($Ni(O_2CCH_3)_2$) |
| Iridium | Iridium (IV) chloride; Hydrogen hexachloroiridate (IV) hydrate; Ammonium hexachloroiridate (III) monohydrate |
| Chromium | Chromium nitrate ($Cr(NO_3)_3$); chromium chloride ($CrCl_3$) |
| Rhenium | Rhenium (VII) oxide; Rhenium (III) chloride |
| Chromium Oxide | $K_2Cr_2O_7$; chrome carboxylates; and chromium oxalate |
| Manganese Oxide | $KMnO_4$; manganese nitrate; manganese acetate; manganese carboxylates; manganese alkoxides; and $MnO_2$ |
| Tungsten Oxide | $Na_2WO_4$ and $W_2O_3$ |
| Molybdenum Oxide | $K_2MoO_4$ and $MoO_2$ |
| Cobalt Oxide | cobalt-amine complexes; cobalt carboxylates and cobalt oxides |
| Nickel Oxide | nickel-amine complexes; nickel carboxylates and nickel oxides |
| Copper Oxide | copper-amine complexes; copper carboxylates and copper oxides |
| Iron Oxide | iron nitrate |

Because of their lower cost, some preferred precursors from Table 1 include nitrates, acetates and chlorides.

Electrode Formation

Additionally, in some embodiments, the invention is directed to electrodes, particularly electrodes for fuel cells such as direct methanol fuel cells (DMFC) or hydrogen-air fuel cells, comprising the above-described catalyst particles, as well as to processes for forming such electrodes. In a preferred embodiment, the above described catalyst particles are formulated into an ink, which is deposited onto carbon cloth or carbon paper or directly on a membrane (e.g., a polymer electrolyte membrane (PEM), such as a Nafion membrane) to form an electrode. The depositing step may be accomplished by spray deposition. Alternatively, the deposition of a catalyst particles according to the present invention can be carried out, for example, by pen/syringe, continuous or drop on demand ink-jet, droplet deposition, spraying, flexographic printing, lithographic printing, gravure printing, other intaglio printing, decal transfer and others. See, e.g., U.S. Patent Publication No. 2004/0038808, filed Apr. 16, 2003, the entirety of which is incorporated herein by reference, which discloses processes for printing catalyst-containing inks onto PEM's using direct write printing processes such as ink jet printing.

Processes for forming electrodes and membrane electrode assemblies in spray deposition processes from inks comprising catalyst particles are fully disclosed in copending U.S. patent application Ser. No. 11/534,561 filed Sep. 22, 2006 and Ser. No. 11/679,758 filed Feb. 27, 2007, the entireties of which are incorporated herein by reference.

EXAMPLES

The present invention will be better understood in view of the following non-limiting examples.

Example 1. Preparation of High Surface Area Carbon with Vulcan VXC72® by Etching 21.8 kg of carbon black VXC72® (Cabot Corp.) pellets were loaded into a fluidized bed reactor (see FIG. 6 for a flow diagram of a steam etching system), and the bed was purged with nitrogen through a gas pre-heater while the bed was being heated up. After the bed temperature reached the set point of about 950° C., steam was introduced into the reactor from a steam generator and the steam etching process began. In this example, pure steam was employed, although in other embodiments, a nitrogen line may remain partially open during the process, depending on the desired steam etching conditions. The steam flow rate was 6.9 kg/hr, and the ratio of steam to carbon (kg steam per hour to total carbon (kg)) was 0.32 kg/hr/kg, which provided desirable fluidization characteristics for the carbon black pellets. After 245 minutes, the steam etching process was stopped and the resulting etched carbon was characterized. BET nitrogen surface area of the above etched VXC72 was 885.3 m$^2$/g as compared to 179 m$^2$/g of the original VXC72 carbon black (Table 2) reflecting a 5 times increase after etching.

A comparison of pore size distribution of the parent VXC72 carbon black (FIG. 10) and the etched particles of Example 1 (FIG. 11) reveals that the process of steam etching significantly increased the pore size in the range of about 2 to about 5 nm.

Examples 2A & 2B. Preparation of High Surface Area Carbon Blacks with BP700 (Ex. 2A) and BP800 (Ex. 2B) by Steam Etching Under similar processes as described in Example 1, carbon blacks having different properties, BP700® and BP800®, were employed in the steam etching process. The steam etching conditions are listed in Table 2. The BET surface area, pore volume and average pore size of the resulting etched carbons are listed in Table 2, together with the properties of the original carbon blacks. The BET surface areas of the steam-etched samples had an about 8 fold increase in surface area relative to their parent carbon blacks.

TABLE 2

STEAM ETCHING CONDITIONS
VXC-72, BP700 & BP800

| Powder | Steam rate@ 950° C. (kg/hr) | Carbon loading (kg) | Steam rate/Carbon (Kg/hr/Kg) | Steam etching time (min) | BET surface area (m$^2$/g) | Pore volume (cc/g) | Pore dia (nm) |
|---|---|---|---|---|---|---|---|
| VXC-72 (Parent) (5% PEG) | | | | | 179.4 | 0.414 | 8.46 |
| Example 1 SE-VXC-72 | 6.9 | 21.8 | 0.32 | 245 | 885.3 | 1.23 | 5.47 |
| BP700 (Parent) | | | | | 244.1 | 1.04 | 15.4 |
| Example 2A SE-BP700 | 3.8 | 12 | 0.32 | 270 | 1642.5 | 3.8 | 8.13 |
| BP800 (Parent) | | | | | 236.0 | 0.73 | 12.2 |
| Example 2B SE-BP800 | 3.8 | 16.8 | 0.23 | 360 | 1627.3 | 2.84 | 6.75 |

Example 3. Heat Treating of Carbon Blacks

A commercial carbon black, Ketjen black EC600 (KB)®, was treated at elevated temperatures from 1200 to 2700° C. with ramp times of 5-6 hours and dwelled for 2 hrs at the desired temperature under inert gas (N$_2$) atmosphere. The treatment conditions are listed in Table 3. Examples 3A-3F correspond with heat treated samples at 1200° C., 1500° C., 1800° C., 2100° C., 2400° C. and 2700° C., respectively. The d spacing calculated from XRD for Examples 3A-3F were 0.3593 nm, 0.3422 nm, 0.3495 nm, 0.3458 nm, 0.3449 nm and 0.3429 nm, respectively, as compared to the unmeasureable d spacing of its original ("pure" amorphous) KB EC600 powder, revealing that the level of graphitization generally increased significantly after heat treatment. Generally, with increasing treatment temperature, degree of graphitization also increased.

TABLE 3

HEAT TREATING CONDITIONS KB EC600 ®

| Powder | Heat treated temperature (° C.) | d spacing (nm) | BET Surface Area (m²/g) | Total pore volume (cc/g) | Pore diameter (nm) |
|---|---|---|---|---|---|
| Ketjen Black EC600 (parent) | N/A | ~ | 1451.6 | 2.89 | 6.74 |
| Example 3A | 1200* | 0.3593 | 1008.9 | 2.38 | 8.41 |
| Example 3B | 1500 | 0.3422 | 626.1 | 2.08 | 11.86 |
| Example 3C | 1800 | 0.3495 | 412.3 | 1.81 | 14.43 |
| Example 3D | 2100 | 0.3458 | 323.1 | 1.64 | 16.9 |
| Example 3E | 2400 | 0.3449 | 220.0 | 1.4 | 21.2 |
| Example 3F | 2700 | 0.3429 | 220.0 | 1.5 | 26.7 |

*Two dwelling times were used, 2 hrs and 6 hrs, respectively.

Example 4. Heat Treating of Steam Etched Carbon Black SE-VXC72

Steam etched VXC72 (SE-VXC72) from Example 1 was subjected to a heat treatment at different temperatures, as described in Example 3. The d spacing of heat-treated SE-VXC72 at 1200° C., 1500° C., 1800° C., 2100° C., and 2400° C. was 0.3565 nm, 0.3487 nm, 0.3484 nm, 0.3470 nm and 0.3449 nm, respectively, as compared to the value of d spacing of 0.3572 nm of SE-VXC72. The lower d spacing values for the heat-treated SE-VXC72 indicates the increased level of graphitization. The SE-VXC72 sample that was heat treated at 1800° C. had a BET surface area of 280 m²/g, a pore volume of 1.32 cc/g, and an average pore size of 18.8 nm.

Example 5. Calcination of Graphitized Ketjen Black (KB) in Air

A certain amount of heat-treated KB from Examples 3A-3F was calcined in air according to the following protocol:
a) Heat up from room temperature to 100° C. in air at 2° C./min;
b) Hold at 100° C. for 30 mins in air;
c) Heat up from 100° C. to max temperature, T, in air with ramp 2° C./min; and
d) Hold at T for 4 hours, then allow particles to cool down to room temperature.

Where temperature T was in a range of 370° C. to 570° C., the calcined samples from this process were subjected to the characterization of physicochemical properties, as described in detail in Examples 5A, 5B and 5C.

Example 5A 75 g of KB EC600 heat-treated at 2400° C. from Example 3E was calcined in air at 470° C. according to the protocol described in Example 5. The properties of the sample after calcination are listed in Table 4, together with the parent sample. The d spacing of the sample before and after calcination is relatively unchanged, suggesting that the level of graphitization after calcination was unchanged. The BET surface area of the calcined sample, however, was much greater than the parent sample, i.e., 386 m²/g vs. 234 m²/g, reflecting a greater than 65% increase in surface area.

Example 5B 75 g of KB EC600 heat-treated at 2700° C. from Example 3F was calcined in air at 470° C. according to the protocol described in Example 5. The properties of the sample after calcination are listed in Table 4, together with the parent sample. The change in d spacing of the sample before (0.3429 nm) and after calcination (0.3470 nm) is relatively small suggesting that the level of graphitization after calcination remains substantially the same. The BET surface area of the calcined sample, however, was much greater than the parent sample, i.e., 324 m²/g vs. 200 m²/g, reflecting a greater than 50% increase in surface area.

Example 5C 75 g of KB EC600 heat-treated at 2700° C. from Example 3F was calcined in air at 520° C. according to the protocol described in Example 5. The properties after calcination are listed in Table 4, together with the parent sample. The d spacing of the sample before (0.3429 nm) and after calcination (0.3438 nm) was relatively small suggesting that the level of graphitization after calcination remained substantially the same. The BET surface area of the calcined sample, however, was much greater than the parent sample, i.e., 454 m²/g vs. 200 m²/g, reflecting a greater than 100% increase in surface area.

X-ray photoelectron spectroscopy (XPS) analysis showed significant increase of oxygen content on the carbon surface after the calcining in air.

TABLE 4

CALCINATION OF HEAT-TREATED KB IN AIR

| Carbon Type | BET (m²/g) | Pore Volume (cc/g) | Pore Size (nm) | O % content (XPS) | d(002) spacing by XRD |
|---|---|---|---|---|---|
| Example 3E | 234 | 1.43 | 24.4 | 0.03 | 0.3449 |
| Example 5A | 386 | 1.76 | 18.2 | 0.65 | 0.3449 |
| Example 3F | 220 | 1.5 | 26.7 | 0 | 0.3429 |
| Example 5B | 324 | 1.54 | 18.9 | 0.78 | 0.3470 |
| Example 5C | 454 | 2.23 | 19.6 | 1.33 | 0.3438 |

Example 6A. Production of 60 wt % Pt Electrocatalyst on Graphitized Carbon 28.72 g of Methocel E3 cellulose from Dow Chemicals and 1.64 g of Surfynol DF110D defoamer from Air Products was added to 169.64 g of Ketjen Black EC600 heat treated at 2100° C., as obtained in Example 3D, in a one-liter container, and DI water was added to make up roughly 10 wt % solution. The solution was then subjected to high shear mixing at 8000 rpm for one hour. The resulting mixture was processed to disperse the carbon using a dispersing agent and enough DI water was added to make up 7.78 wt. % carbon loading in the dispersion.

146.92 g carbon basis from the above carbon dispersion was added into a mixing container. 180.45 g of tetraamine platinum hydroxide was added to a separate container. 672.63 g of DI water was added into a third container.

Under the high shearing conditions, the above amount of tetraamine platinum hydroxide was added to the carbon dispersion. After the high shear mixing for 10 minutes, the resulting solution was then converted in a spray conversion reactor under controlled conditions at an inlet temperature of 540° C. and an outlet temperature of 300° C. The resulting catalyst was designated as CATALYST 1. The average crystallite size of the Pt particles was estimated by XRD to be about 4-5 nm.

Example 6B. Production of 60 wt % $Pt_{50}Co_{50}$ Alloy Electrocatalyst Powders on High Surface Area Graphitized Carbon 7.3 g of Methocel E3 cellulose from Dow Chemicals was added into 41.95 g of calcined heat treated Ketjen black, as described in Example 5C, in a one-liter container, and DI water was added to make up roughly a 10 wt % solution. The obtained solution was then subjected to high shear mixing at 8000 rpm for one hour. The resulting mixture was processed to disperse the carbon using a dispersing agent and enough DI water added to make up 7.36 wt % carbon loading in the dispersion.

For making a 50 g of theoretical yield of 60 wt % $Pt_{50}Co_{50}$ alloy catalyst, 575.79 g of 4 wt % of tetraammine platinum nitrate salt (TAPN, 5 wt % in Pt) solution was mixed with 174.21 g of 4 wt % of cobalt nitrate salt ($Co(NO_3)_2 \cdot 6H_2O$, 20.3 wt % in Co). Under the high shearing conditions, 500 g of 4 wt % of carbon solution diluted from the above carbon dispersion was gradually added into 4 wt % metal solution. After shear mixing for 10 minutes, the resulted solution was then fed into the spray conversion reactor and the solution was converted into the supported catalyst under the controlled conditions such as inlet temperature at 540° C., and outlet temperature at 300° C.

The alloy powders formed directly from the spray conversion reactor were subjected to post-processing according to the following protocol:

(a) $N_2$ purge at room temperature (30° C.) for 30 minutes;
(b) Ramp up to 50° C. in $N_2$ at 5° C./minute and hold for 20 minutes;
(c) Ramp up to 150° C. in $N_2$ at 5° C./minute from 50° C. and hold for 20 minutes in $N_2$;
(d) Ramp up to 300° C. in $N_2$ at 5° C./minute from 150° C.
(e) Switch to mixture of 5 vol. % $H_2$ and 95 vol. % $N_2$, and maintain at 300° C. for 2 hours; and
(f) Switch to $N_2$, cool down to room temperature at 10° C./minute before collection.

The PtCo alloy powders were then subjected to an acid solution leaching process according to the following protocol.

(a) Mixing of PtCo alloy powders with 0.5M $H_2SO_4$ solution;
(b) Refluxing of the slurry at 85° C. for 24 hours;
(c) Filtrating and washing of the refluxed slurry with DI water; and
(d) Drying the washed powder at 90° C. for at least 3 hours.

The powder from Example 6B that was obtained through spray conversion, followed by post-processing, leaching and drying process was denoted as CATALYST 2. The average crystallite size of the Pt alloy particles for CATALYST 2 was about 3-5 nm.

Example 6C. Production of 60 wt % $Pt_{50}Co_{50}$ Alloy Electrocatalyst Powders on High Surface Area Steam Etched Carbon 60 wt % $Pt_{50}Co_{50}$ alloy electrocatalyst powders on carbon obtained through heat treatment of steam-etched VXC 72 carbon support (SE-VXC 72), as described in Example 4, was produced by the same method as described in Example 6B.

The powder in Example 6C after leaching and drying was denoted as CATALYST 3. The average crystallite size of the Pt alloy particles for CATALYST 3 was about 3-5 nm.

Example 6D. (Comparative). Production of 60 wt % Pt on Commercial Ketjen Black (KB) EC600 Carbon Support For making a 100 g of theoretical yield of 60 wt % Pt/KB, 4 wt % Pt solution was prepared by mixing of 543 g of tetraammine platinum hydroxide salt with 957 g of DI water, under the high shearing conditions. 1000 g of 4 wt % of carbon solution was gradually added into 4 wt % metal solution. After shear mixing for 10 minutes, the resulted solution was then fed into the spray conversion reactor and the solution was converted into the supported catalyst under the controlled conditions such as inlet temperature at 540° C., and outlet temperature at 300° C. The catalyst made was designated as CATALYST 4. The average crystallite size of the Pt particles was estimated to be about 3.5 nm.

Example 7. MEA Production and Lamination

Four MEAs were formed from CATALYST 1, 2, 3 and 4, respectively, according to the following procedure. 300 mg of electrocatalyst material CATALYST 1, 2, 3 or 4 was mixed with 3 g of de-ionized water and 2.55 g of 5 wt % Nafion solution. The solution was then placed into 250 W ultrasonic bath and sonicated for 10 minutes. The resultant ink was used to print the cathode of a catalyst coated membrane (CCM) on one surface of a Nafion 212 layer having an active area 50 $cm^2$ such that the desired amount of Pt or Pt alloy catalyst was loaded in the cathode. A cathode loading of 0.4 mg $Pt/cm^2$ was used for corrosion durability testing for 60 wt. % Pt/C or 60 wt. % PtCo/C catalysts. The anode of the CCM was produced by printing an ink containing a 10 wt % Pt/C onto the opposite surface of the Nafion at a standard loading of 0.05 mg $Pt/cm^2$ for all MEAs. Identical gas diffusion layers were applied to the anode and the cathode to make a membrane electrode assembly (MEA), followed by hot press with a pressure of 8250 pound force at 150° C. for 5 minutes.

Example 8. Electrochemical Evaluation of Carbon Corrosion

In the electrochemical evaluation of corrosion resistance of carbon supports, a chronoamperometric protocol was employed using a three-electrode system in liquid electrolyte (2 M $H_2SO_4$ acid). The working electrode was an air breathing gas diffusion electrode with the gas diffusion and catalytic layers pressed onto a Pt mesh. Pt wire was used as counter electrode and Mercury/Mercuric Sulfate was used as reference electrode.

A gas diffusion layer was initially formed by pressing 500 mg of hydrophobized (Teflonized) carbon black with up to 35 wt. % Teflon onto a Platinum mesh. Onto this gas diffusion layer, the catalytic layer comprising a mixture of 65 wt % of the carbon black under investigation and 35 wt % of teflonized carbon black of the same type were mixed and pressed to form the working electrode. Loadings for these experiments were maintained at 67.6 $g_{carbon}/m^2$. 2M Sulfuric acid was used as the electrolyte media and the half-cell system was kept at room temperature. Chronoamperometric measurements were made at various potentials, e.g., 0.8V, 1.0V, 1.2V, 1.4V, and 1.5V vs. Normal Hydrogen Electrode (NHE).

Figure 12:
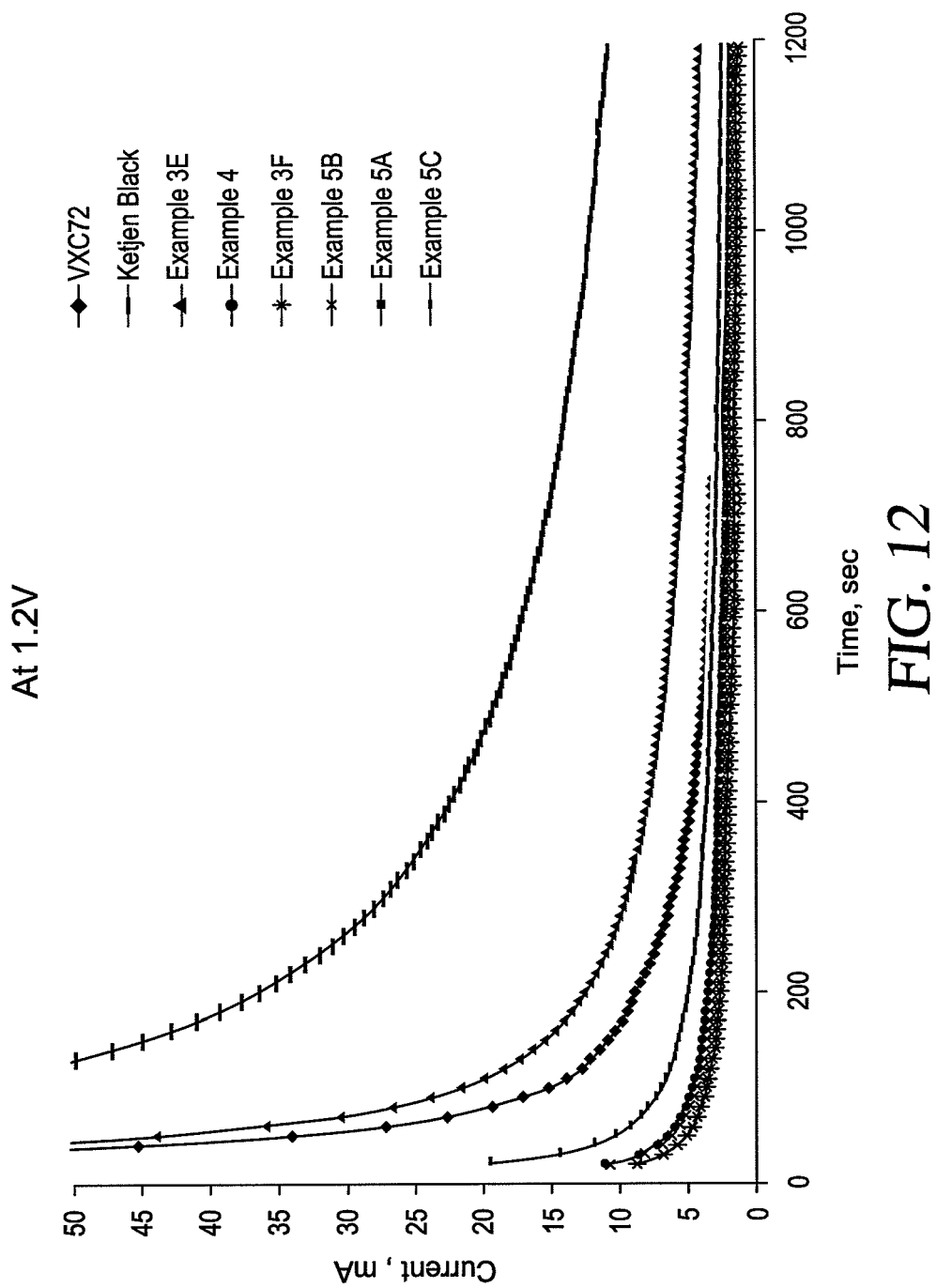
FIG. 12 is a plot of the corrosion current vs. time at 1.2V for different carbon supports measured by chronoamperometric protocol.

The results of corrosion testing at 1.2V for carbons under the above conditions are shown in FIG. 12, which plots corrosion current (mA) as a function of time. Generally, the higher the corrosion current for the carbon at the same time, the greater its rate of electrochemical oxidation or corrosion. The commercial Ketjen black (KB EC 600) had the highest corrosion rate among the carbons investigated, particularly at the initial stage, e.g., between 0 and 200 s. In contrast, the carbon black that was heat treated at 2700° C. (Example 3F) had the lowest carbon corrosion current. These results are in agreement with the d spacing value as measured by XRD indicating the higher graphitization levels lead to lower corrosion currents. Also, from FIG. 12 it can be seen that the high surface area graphitized carbon (Example 4, Example 5A-5C) have much lower corrosion currents and better corrosion resistance than the commercial carbon blacks such as Ketjen black EC 600 and Vulcan XC72.

Table 5 lists the chronoamperometric measurements for different carbons at various potentials vs Normal hydrogen electrode (NHE). It can be seen from the data that the carbon corrosion and the corrosion currents become more severe at higher voltages. However, for the range of voltages (0.8 to 1.5 V) the carbon supports of various embodiments of the current invention (e.g., Examples 4, 5A, 5B, 5C) show significantly lower corrosion currents than the comparative examples. The superior corrosion resistance of the carbon supports of the current invention is further amplified by the following consideration. The corrosion currents in this evaluation are normalized by the same mass of carbon and are not normalized by the carbon support surface area and typically carbons with higher surface area would have higher corrosion currents. The unexpected advantageous result for the carbon supports of the current invention is that compared to Vulcan XC72 (BET surface area 250 $m^2/g$), highly graphitized carbons (Example 4 with BET surface area 280 $m^2/g$, Example 5A with BET surface area 386 $m^2/g$, Example 5B with BET surface area 324 $m^2/g$ and Example 5C with BET surface area 454 $m^2/g$) have lower corrosion currents as measured under the same voltage. This clearly demonstrates that high surface area corrosion-resistant carbon can be produced by the present disclosed method.

Table 5, below, lists the chronoamperometric measurements for different carbons at various potentials vs. Normal Hydrogen Electrode (NHE).

TABLE 5

CHRONOAMPEROMETRIC MEASUREMENTS VS. NHE

| Samples | Current (mA) under different voltages at 200 sec | | | | |
|---|---|---|---|---|---|
| | 0.8 V | 1.0 V | 1.2 V | 1.4 V | 1.5 V |
| VXC72 | 1.56 | 4.10 | 8.91 | 53.30 | 112.20 |
| Ketjen Black | 4.22 | 13.50 | 36.40 | 102.90 | 153.00 |
| Example 3E | 2.27 | 7.37 | 12.46 | 42.60 | 100.40 |
| Example 4 | 0.14 | 0.58 | 3.63 | 17.60 | 61.70 |
| Example 3F | 0.21 | 0.51 | 2.68 | 12.59 | 46.40 |
| Example 5A | 0.46 | 1.46 | 4.74 | 21.70 | — |
| Example 5B | 0.27 | 0.78 | 3.37 | 18.50 | 55.70 |
| Example 5C | 0.29 | 0.92 | 4.96 | 28.60 | 69.90 |

Example 9. MEA Performance

MEA performance evaluation was completed in a 50 $cm^2$ cell. The MEA was conditioned for approximately 12 hours under the following conditions. Cell temperature was set to 80° C. Anode flow rate was 520 SCCM hydrogen, with no backpressure, and 100% RH (anode bubbler dew point was 80° C.). To avoid condensation of water in the gas line, the line was preheated to 85° C. Cathode flow rate was 2060 SCCM air, with no backpressure, and 100% RH (cathode bubbler dew point was 80° C.). To avoid condensation of water in the gas line, the line was preheated to 85° C. To condition the MEA, the voltage on the cell was cycled between 0.8V, where it was held for 200 seconds, and 0.5V where it was held for 600 seconds. The voltage cycling was continued for 12 hours.

Once conditioning was completed, the MEA was evaluated under the following Corrosion Test Protocol.

Corrosion Testing Protocol

Step 1, Beginning of Life Performance: Cell temperature was set to 80° C. Anode flow rate was stoichiometrically controlled at a stoichiometry of 3 for hydrogen, with 10 pounds per square inch (0.68 atm) back pressure, and 50% RH (anode bubbler dew point was 64° C.). To avoid condensation of water in the gas line, the line was preheated to 69° C. Cathode flow rate was stoichiometrically controlled at a stoichiometry of 3 air, 10 pounds per square inch (0.68 atm) back pressure, and 50% RH (cathode bubbler dew point was 64° C.). To avoid condensation of water in the gas line, the line was preheated to 69° C. Data was collected galvanostatically starting at a total current of 50 A (1 $A/cm^2$). The cell was held at 50 A for 10 minutes with the voltage being measured and averaged over this time period. The average voltage over the 10 minutes was recorded. The average voltage was then collected in the same way at total currents of 40, 30, 25, 20, 15, 10, 5 and 0 A.

Step 2, Accelerated Corrosion: After Beginning of Life Performance (Step 1) was measured, the test cell was connected to an external power supply, which was set to 1.2 volts and left for 15 hours under the following conditions. During Step 2 (Accelerated Corrosion), the cell temperature was set to 80° C. Anode flow rate was 520 SCCM hydrogen, with no back pressure, and 100% RH (anode bubbler dew point was 80° C.). To avoid condensation of water in the gas line, the line was preheated to 85° C. The cathode flow rate was 2060 SCCM nitrogen, with no back pressure, and 100% RH (cathode bubbler dew point was 80° C.). To avoid condensation of water in the gas line, the line was preheated to 85° C.

After Step 2 (15 h accelerated corrosion) was completed, Step 1 was repeated and a polarization curve recorded. Steps 1 and 2 were iteratively repeated until the MEA had been exposed to total of 45 to 210 hours of Accelerated Corrosion.

Figure 13A:
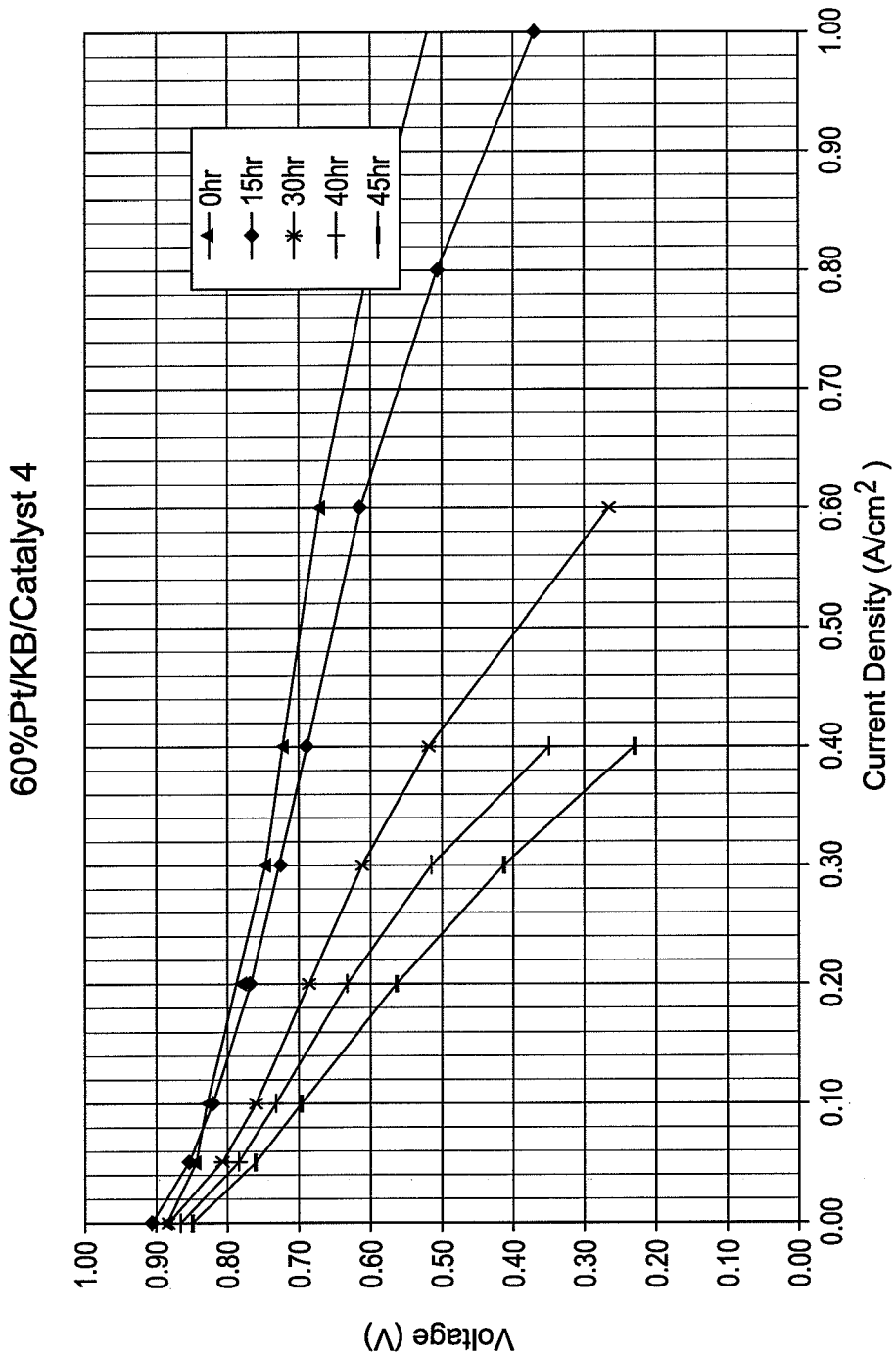
FIGS. 13A-C show the performance of catalysts in MEAs under the carbon corrosion testing protocol of Example 9.
Figure 13B:
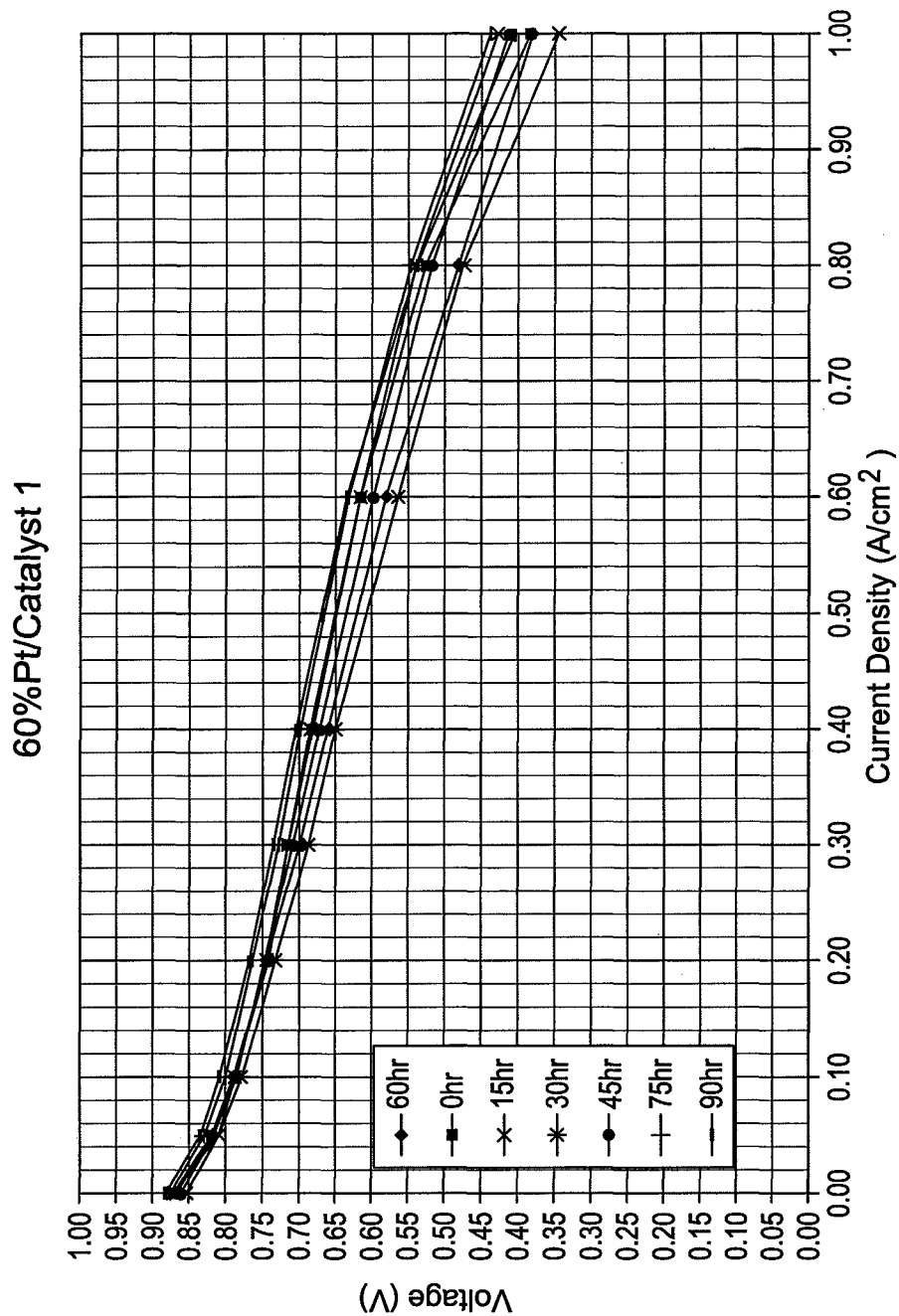
Figure 13C:
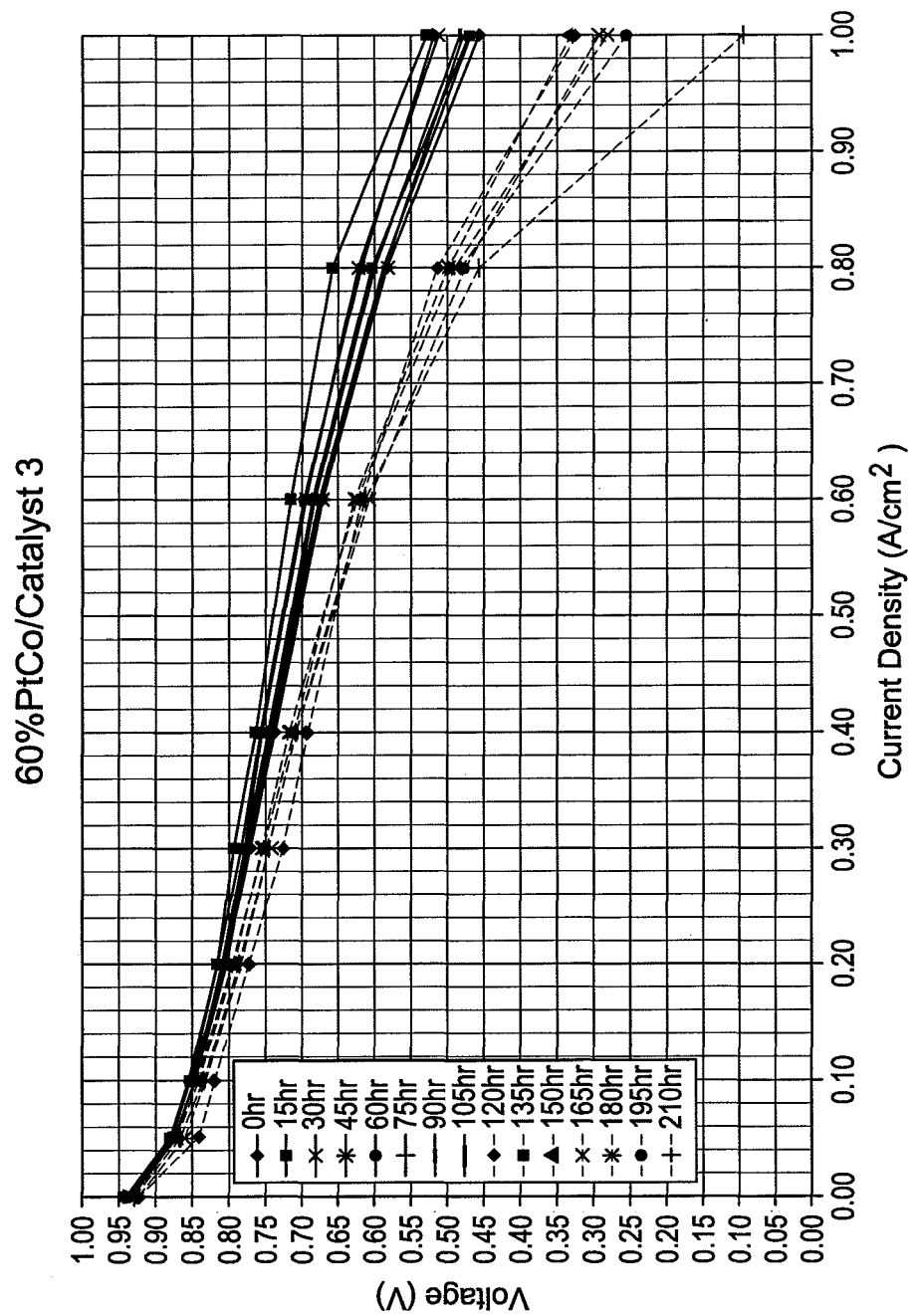

Carbon corrosion resistance of the electrocatalysts was compared based on the voltage difference between the polarization curves recorded in Steps 1 at 1 $A/cm^2$ after a certain period of time of Accelerated Corrosion, Step 2 of 45 to 210 hours. Better carbon corrosion resistance is reflected by a smaller loss of voltage between the Beginning of Life Performance at 1 $A/cm^2$ and after 45 to 210 h of Accelerated Corrosion. FIG. 13A, FIG. 13B and FIG. 13C show the change in performance of CATALYST 4 (comparative example), CATALYST 1 and CATALYST 3, respectively, after Accelerated Corrosion for various times between 15 and 210 h.

For 60 wt % Pt supported on the commercial carbon black (Comparative Example, CATALYST 4, FIG. 13A), it can be seen that after only 30 hours, the voltage at 1 $A/cm^2$ can no longer be measured because of severe corrosion of the conventional carbon support which leads to catastrophic loss of performance as illustrated in FIG. 13A. FIG. 13B shows the performance of 60 wt. % Pt supported on heat-treated KB (CATALYST 1). During the 100 hour testing period, only small changes of 0.35-0.45 V at 1 A/cm² were measured, revealing a significant improvement of the carbon stability towards corrosion as compared to the catalyst supported on commercial carbon black support (FIG. 13A). Surprisingly, not only did the performance at 1 A/cm² not show significant decline, but it was about 50 mV higher after 90 h of corrosion test. Without being bound by any theory, the increased performance can be attributed to changes in the surface composition of the graphitized carbon support as results of the corrosion process. These results confirm that the MEA comprising a catalyst based on the carbon supports of the current invention can deliver superior durability when subjected to operating conditions where carbon corrosion is facilitated.

The performance testing of CATALYST 3 based on high surface area graphitized carbon obtained through oxidation of heat treated carbon in air (Example 5C) under carbon corrosion testing protocol is shown in FIG. 13C. The test results reveal that even after 135 hours, the voltage at 1 A/cm² was still maintained above 0.45 V, which is significantly higher performance than at Beginning of Life (0 h). For CATALYST 3 even after 180 h accelerated corrosion test less than 50 mV loss was observed at 1 A/cm², which indicates an exceptionally high durability.

It is noted that the foregoing examples have been provided merely for the purpose of explanation and are in no way to be construed as limiting of the present invention. While the present invention has been described with reference to various exemplary embodiments, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

We claim:

1. A process for making high surface area graphitized carbon particles, comprising the steps of: (a) providing composite particles, each particle comprising a carbon phase and a template phase; (b) graphitizing the composite particles to form graphitized composite particles; and (c) removing the template phase from the graphitized composite particles to form high surface area graphitized carbon particles, wherein the surface area of the high surface area graphitized carbon particles is from 200 m²/g to 1000 m²/g, wherein the carbon phase comprises a material selected from the group consisting of carbon black, amorphous carbon, and partially graphitized carbon wherein the high surface area graphitized carbon particles are more graphitized than the partially graphitized carbon.

2. The process of claim 1, wherein the process further comprises the steps of: (d) mixing silica particles having a porous structure with a carbon precursor under conditions effective for the carbon precursor to infiltrate the porous structure of the silica particles; (e) converting the carbon precursor to carbon within the porous structure of the porous silica particles to form the composite particles provided in step (a).

3. The process of claim 1, wherein the carbon phase comprises carbon black.

4. The process of claim 1, wherein the carbon phase comprises amorphous carbon.

5. The process of claim 1, wherein the carbon phase comprises partially graphitized carbon, and wherein the high surface area graphitized carbon particles are more graphitized than the partially graphitized carbon.

6. The process of claim 1, wherein the graphitizing step comprises heat treating the composite particles to a temperature ranging from 1000° C. to 2700° C. for a period of time of from 0.01 to 10 hours.

7. The process of claim 1, wherein the graphitizing step comprises contacting the composite particles with a catalyst at a temperature less than 1200° C. for a period of time of from 0.01 to 10 hours.

8. A process for making high surface area graphitized carbon particles, comprising the steps of: (a) providing composite particles, each particle comprising a carbon phase and a template phase; (b) graphitizing the composite particles to form graphitized composite particles; and (c) removing the template phase from the graphitized composite particles to form high surface area graphitized carbon particles, wherein the surface area of the high surface area graphitized carbon particles is from 200 m²/g to 600 m²/g, wherein the carbon phase comprises a material selected from the group consisting of carbon black, amorphous carbon, and partially graphitized carbon wherein the high surface area graphitized carbon particles are more graphitized than the partially graphitized carbon.

9. The process of claim 8, wherein the process further comprises the steps of: (d) mixing silica particles having a porous structure with a carbon precursor under conditions effective for the carbon precursor to infiltrate the porous structure of the silica particles; (e) converting the carbon precursor to carbon within the porous structure of the porous silica particles to form the composite particles provided in step (a).

10. The process of claim 8, wherein the carbon phase comprises carbon black.

11. The process of claim 8, wherein the carbon phase comprises amorphous carbon.

12. The process of claim 8, wherein the carbon phase comprises partially graphitized carbon, and wherein the high surface area graphitized carbon particles are more graphitized than the partially graphitized carbon.

13. The process of claim 8, wherein the graphitizing step comprises heat treating the composite particles to a temperature ranging from 1000° C. to 2700° C. for a period of time of from 0.01 to 10 hours.

14. The process of claim 8, wherein the graphitizing step comprises contacting the composite particles with a catalyst at a temperature less than 1200° C. for a period of time of from 0.01 to 10 hours.

* * * * *